US008817734B2

(12) United States Patent
Khoryaev et al.

(10) Patent No.: US 8,817,734 B2
(45) Date of Patent: Aug. 26, 2014

(54) PHYSICAL UPLINK SHARED CHANNEL (PUSCH) TRANSMISSION TIME INTERVAL (TTI) BUNDLING

(75) Inventors: Alexey Khoryaev, Dzerzhinsk (RU); Andrey Chervyakov, Nizhny Novgorod (RU); Mikhail A. Shilov, Nizhny Novgorod (RU); Alexander Maltsev, Nizhny Novgorod (RU); Jong-Kae Fwu, Sunnyvale, CA (US); Sergey Panteleev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 13/620,093

(22) Filed: Sep. 14, 2012

(65) Prior Publication Data

US 2013/0242889 A1 Sep. 19, 2013

Related U.S. Application Data

(60) Provisional application No. 61/612,188, filed on Mar. 16, 2012.

(51) Int. Cl.
*H04W 72/04* (2009.01)
*H04L 12/26* (2006.01)
*H04J 3/00* (2006.01)

(52) U.S. Cl.
CPC .......... *H04W 72/04* (2013.01); *H04W 72/0413* (2013.01); *H04W 72/0446* (2013.01)
USPC ........... 370/329; 370/330; 370/336; 370/280; 370/252

(58) Field of Classification Search
None
See application file for complete search history.

(56) References Cited

U.S. PATENT DOCUMENTS

| | | | | |
|---|---|---|---|---|
| 8,321,740 | B2 * | 11/2012 | Kuo | 714/748 |
| 8,416,741 | B2 * | 4/2013 | Chan et al. | 370/329 |
| 8,520,560 | B2 * | 8/2013 | Papasakellariou et al. | 370/280 |
| 2009/0257408 | A1 * | 10/2009 | Zhang et al. | 370/336 |
| 2010/0098010 | A1 * | 4/2010 | Kuo | 370/329 |
| 2010/0329188 | A1 * | 12/2010 | Jen | 370/328 |
| 2011/0032895 | A1 * | 2/2011 | Englund et al. | 370/329 |
| 2011/0075611 | A1 * | 3/2011 | Choi | 370/329 |
| 2011/0200020 | A1 * | 8/2011 | Xu et al. | 370/336 |
| 2012/0020309 | A1 | 1/2012 | Malladi et al. | |
| 2012/0057476 | A1 * | 3/2012 | Chan et al. | 370/252 |

FOREIGN PATENT DOCUMENTS

WO    2009/157729 A3    3/2010

OTHER PUBLICATIONS

Principle and Performance of TTI Bundling for VoIP in LTE FDD Mode, J. Han, H. Wang, in Proc. of Wireless Communications and Networking Conference, 2009, 6 pages.

(Continued)

*Primary Examiner* — Candal Elpenord
(74) *Attorney, Agent, or Firm* — Thorpe North & Western LLP

(57) ABSTRACT

Technology for organizing physical uplink shared channel (PUSCH) transmissions is disclosed. One method can include a node generating transmission time interval (TTI) bundling configuration information with instructions to bundle PUSCH transmissions for a hybrid automatic repeat request (HARQ) process in at least 20 TTIs in an approximately 50 subframe time interval in at least one PUSCH TTI bundle. The node can transmit the TTI bundling configuration information to a wireless device to enable the wireless device to transmit a PUSCH signal in the at least one PUSCH TTI bundle within an approximately 50 subframe time interval.

30 Claims, 15 Drawing Sheets

(56) References Cited

OTHER PUBLICATIONS

LTE coverage improvement by TTI bundling, R. Susitaival, M. Meyer, in Proc. of Vehicular Technology Conference, 2009, 5 Pages.
Performance of TTI Bundling for VoIP in EUTRAN TDD Mode, Haiming Wang, et al., IEEE 2009, 5 Pages.
Interdigital Communications, LLC et al., "Improving LTE UL Coverage for VoIP", 3GPP TSG-RAN WG1 Meeting #68, R1-120145, Dresden, Germany, Feb. 6-10, 2012, 6 pages.
International Search Report and Written Opinion received for PCT Patent Application No. PCT/US2013/032560, mailed on Jun. 28, 2013, 12 pages.
3GPP TR 36.824 V1.0.0 (Feb. 2012), 3rd Generation Partnership Project; Technical Specification Group Radio Access Network: Evolved Universal Terrestrial Radio Access (E-UTRA); LTE Coverage Enhancements (Release 11). Published 2011. 14 pages.
Interdigital Communications, LLC et al., "ILTE Coverage Enhancements in Rel-11", 3GPP TSG-RAN WG1 Meeting #52, R1-120145, Bratislave, Slovakia, May 31-Jun. 3, 2011, 2 pages.

\* cited by examiner

PHYSICAL UPLINK SHARED CHANNEL (PUSCH) TRANSMISSION TIME INTERVAL (TTI) BUNDLING

RELATED APPLICATIONS

This application claims the benefit of and hereby incorporates by reference U.S. Provisional Patent Application Ser. No. 61/612,188, filed Mar. 16, 2012.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the UE to the eNodeB via a physical uplink shared channel (PUSCH). The PUSCH can carry scheduled data traffic and possible control signaling. The PUSCH can be carried in subframes of a radio frame. A one millisecond (ms) subframe can allow a one ms scheduling interval (or transmission time interval (TTI)). Uplink coverage may be limited by a maximum transmission power of the wireless device. In some situations, a voice-over-internet protocol (VoIP) packet, for example, cannot be transmitted in a one ms subframe with an acceptable error rate. One solution to transmit a VoIP packet is to segment the VoIP packet at higher layers to allow the VoIP packet to be transmitted over several subframes. However, such segmentation can result in additional signaling overhead for each segment (including resource allocation signaling and hybrid automatic repeat request (hybrid ARQ or HARQ) acknowledgement signaling). A technique for improving uplink VoIP coverage at a cell edge can be to use TTI bundling, where a single transport block (TB) from a medium access control (MAC) layer is transmitted in multiple consecutive subframes, with one set of signaling messages (e.g., HARQ acknowledgement feedback) for the whole uplink transmission. For example, the PUSCH can allow groups of 4 TTIs to be bundled together in addition to the single one ms TTI.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
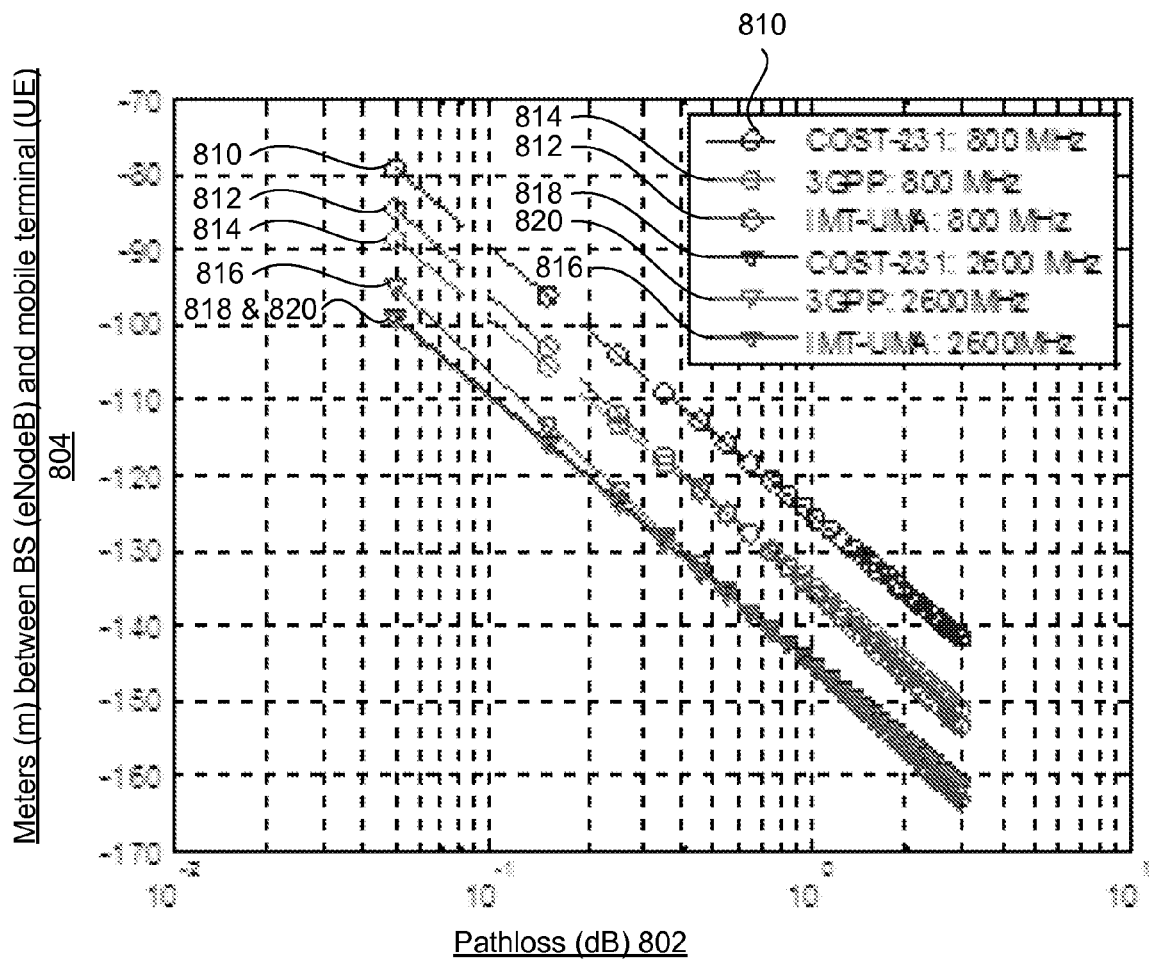
FIG. 1 illustrates a pathloss comparison between a fourth generation (4G) frequency spectrum (e.g. 2.6 gigahertz (GHZ)) and a third generation (3G) frequency spectrum (e.g. 800 megahertz (MHZ)) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Coverage of a cellular network can be a main metric used by network operators when planning initial wireless network system deployments. A high level of user satisfaction can be achieved with a large system coverage area. The existing third generation (3G) site deployments can be used for fourth generation (4G) LTE networks, but the LTE networks may have reduced coverage due to higher carrier frequencies (e.g., 2.0 and 2.6 gigahertz (GHz)). The higher carrier frequencies (e.g., 2.0 and 2.6 GHz) used for LTE can have propagation and in-building penetration properties that can be much worse than a typical 3G spectrum (e.g., 800 megahertz (MHz)), which can cause poor coverage for LTE networks if the same 3G site grids are reused. For example, FIG. 1 illustrates a comparison of pathloss 802 values between 800 MHz and 2.6 GHz frequency spectrums used by LTE system designers for technology evaluation relative to a distance in meters (m) between a base station (e.g., eNodeB) and a mobile terminal (e.g., UE). The 4G frequencies 816, 818, and 820 can have an approximately 10 decibel (dB) loss relative to 3G frequencies 810, 812, and 814. Due to the imbalance between 3G frequencies and 4G frequencies, LTE networks and protocols can include features to improve and enhance the coverage of LTE systems.

Figure 2:
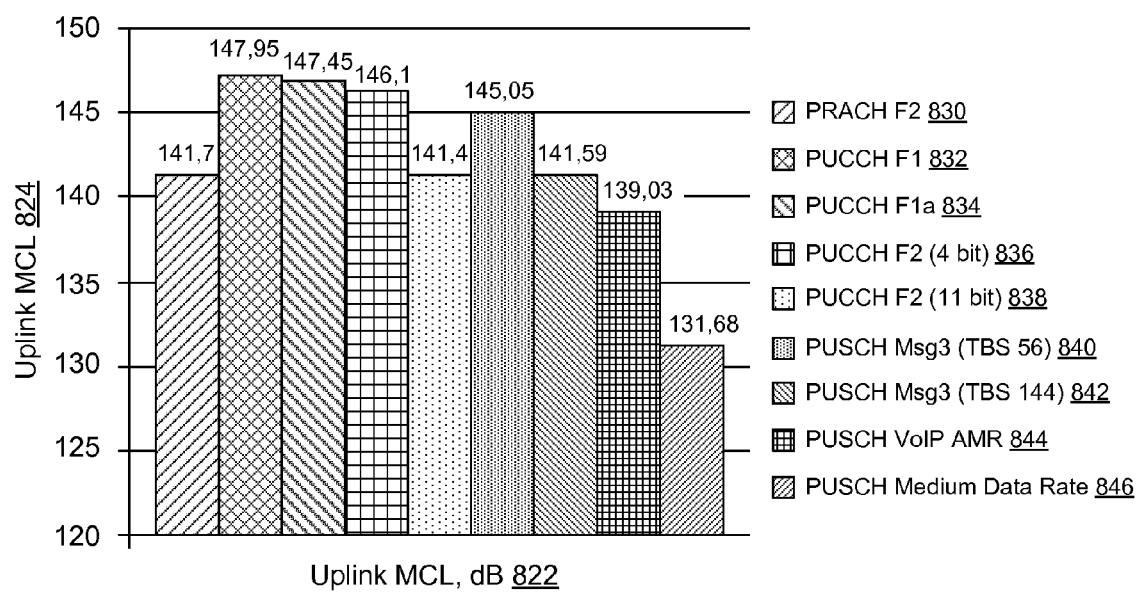
FIG. 2 illustrates a maximum coupling loss (MCL) performance comparison of different downlink (DL) and uplink (UL) physical channels in accordance with an example.

Coverage performance bottlenecks or a transmission power imbalance can exist between downlink and uplink data and/or control channels. A maximum coupling loss (MCL) can be used as a metric for coverage performance of different downlink (DL) and uplink (UL) physical channels. FIG. 2 illustrates an uplink MCL 822 and 824 performance of different UL physical channels. For example, FIG. 2 illustrates the MCL for a format 2 (F2) physical random access channel (PRACH) 830, a format 1 (F1) physical uplink control channel (PUCCH) 832, a format 1a (F1a) PUCCH 834, a format 2 (F2) 4 bit PUCCH 836, a F2 11 bit PUCCH 838, a physical uplink shared channel (PUSCH) message 3 (Msg3) with a 56 transport block size (TBS) 840, a PUSCH Msg3 with a 144 TBS 842, an adaptive multi-rate (AMR) voice-over-Internet protocol (VoIP) PUSCH 844, and a medium data rate PUSCH 846. The physical random access channel (PRACH) can be used to carry the random access channel (RACH), which can consists of a preamble signature, which can either randomly selected or pre-assigned. By partitioning the signatures into two groups, the PRACH can carry one bit of higher layer information indicating the amount of resource needed for a next uplink message. The physical uplink control channel (PUCCH) can carry uplink control information including channel quality indicators (CQI), hybrid automatic retransmission request (HARQ) acknowledgment or negative acknowledgment (ACK/NACK), and uplink scheduling requests. Based on the MCL of the downlink and the uplink, the uplink can be a limiting factor in terms of LTE coverage performance. For instance, in the example illustrated in FIG. 2, the PUSCH VoIP transmission mode 844 can have a 139 dB uplink MCL. In an example, the physical uplink shared channel (PUSCH) VoIP transmission can limit LTE coverage. The coverage gap may be reduced by at least one dB using various enhanced configurations of PUSCH transmission time intervals (TTI) bundling.

The uplink (e.g., PUSCH) coverage improvement may be achieved using variations of the TTI bundling mechanism over legacy TTI bundling. For example, a TTI bundling method may be used to transmit a data payload over a larger time duration span than 4 TTIs (where one TTI can be equal to one subframe duration), which can increase the accumulated energy per information bit at a receiver. An additional benefit of TTI bundling can be a reduction of layer two (L2) radio link control (RLC) segmentation overhead and cyclic redundancy check (CRC) overhead which can be substantial for small packet sizes. A TTI can be smallest unit of time in which a node (e.g., eNB) is capable of scheduling a wireless device (e.g., UE) for uplink or downlink transmission.

TTI bundling can include features to improve coverage at cell edge or in poor radio conditions. TTI bundling can repeat the same data in multiple TTIs, which can effectively increase the TTI length allowing a wireless device to transmit for a longer time. A single transport block (TB) can be coded and transmitted in a set of consecutive or interleaved TTIs. A same hybrid ARQ (HARQ) process number can be used in each of the bundled TTIs. The bundled TTIs can be treated as a single resource where a single grant and a single acknowledgement are used. TTI bundling can be activated with higher layer signaling per wireless device. For example, a trigger for TTI bundling can be the wireless device reporting a transmit power that is getting close to a maximum transmit power value.

Legacy TTI bundling can have various limitations. For example, a TTI bundle may have only 4 subframes in frequency-division duplexing (FDD) and time-division duplexing (TDD), a number of physical resource blocks (PRB) for the TTI bundle can be limited to 1-3 PRBs in a frequency allocation (versus time allocation), and the TTI bundle mode can use quadrature phase-shift keying (QPSK) based modulation. Time-division duplexing (TDD) is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically taking turns on the channel. In frequency-division duplexing (FDD), an uplink transmission and a downlink transmission can operate using different frequency carriers. In FDD, interference can be avoided because the downlink signals use a different frequency carrier from the uplink signals.

In an example, voice over internet protocol (voice over IP or VoIP) service can place additional constraints on TTI bundling. Voice over IF (VoIP) can refer to communication protocols, technologies, methodologies, and transmission techniques involved in the delivery of voice communications and multimedia sessions over internet protocol (IP) networks, such as the Internet. VoIP can use a low-rate delay sensitive traffic model. For an uplink VoIP coverage example, an adaptive multi-rate (AMR) 12.2 kilobit per second (kbps) codec can be used with 36-41 bytes (up to 328 bits) for a transport block size (TBS) of a radio link control (RLC) service data unit (SDU).

Figure 3:
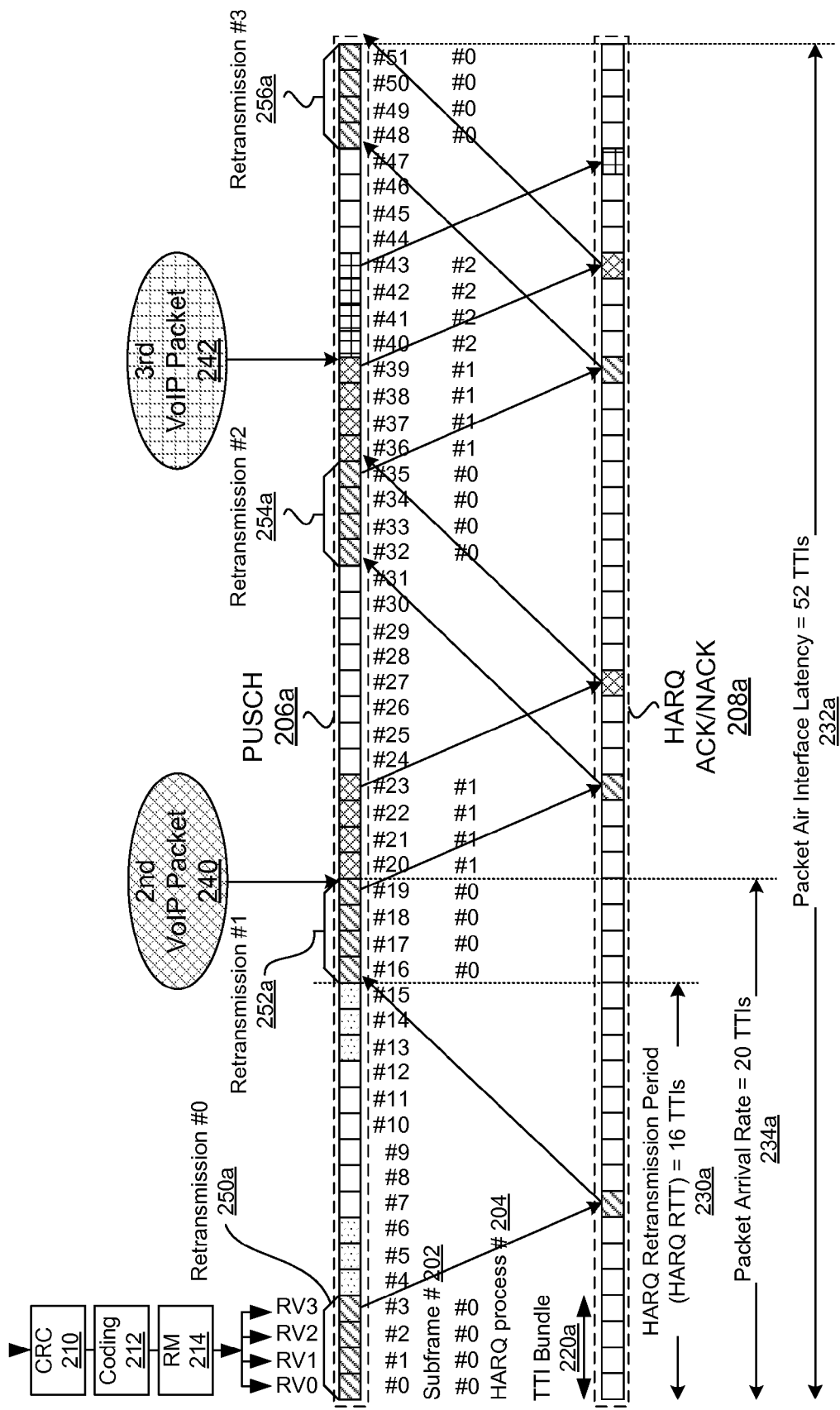
FIG. 3 illustrates a block diagram of a bundle with 4 contiguous transmission time intervals (TTIs) and a 16 subframe TTI bundle retransmission delay in accordance with an example.

The VoIP traffic model constraints on a PUSCH transmission can include a packet arrival rate and a maximum packet air-interface latency (or packet air-interface delay). The packet arrival rate metric can refer to a periodic rate at which a new VoIP packet can be transmitted, which can be measured in subframes, TTIs, or milliseconds (ms). For example, in FIG. 3, the packet arrival rate 234a can be a time, such as 20 TTIs, between an initial packet (e.g., subframe 0 of first packet) and a subsequent packet (e.g., subframe 20 of second VoIP packet 240 and subframe 40 of third VoIP packet 242). The packet air interface latency metric can refer to a total packet transmission time starting from a first TTI of an initial transmission until a last TTI of a final hybrid automatic repeat request (hybrid ARQ or HARQ) retransmission which can be used for a packet transmission, which can be measured in subframes, TTIs, or ms. The HARQ retransmission period or a HARQ round-trip time (RTT) can refer to a time between retransmissions in a HARQ protocol, which can include a total time for a packet to travel from a source (e.g., UE) to a destination (e.g., eNB), for decoding and acknowledgement/negative acknowledgment (ACK/NACK) generation at the destination, for transmission of a response with the ACK/NACK back to the source, and for processing at the source to formulate a retransmission. The HARQ retransmission can include an initial packet and subsequent retransmissions for a packet. As illustrated in FIG. 3, if a TTI bundle 220a includes 4 TTIs with 4 HARQ retransmissions 250a, 252a, 254a, and 256a where each HARQ retransmission period 230a is 16 TTIs, the packet air interface latency can be approximately 50 TTIs (e.g., 52 TTIs). In an example, the term "approximately" can refer to plus or minus 5% of a nominal value (±5% tolerance). For example, approximately 50 subframe time interval can refer to a 48 to 52 subframe time interval. In another example, the term "approximately" can refer to plus or minus 10% of a nominal value (±10% tolerance). For example, approximately 50 subframe time interval can refer to a 45 to 55 subframe time interval.

The HARQ can be a process where data is protected against noisy wireless channels through an error correction mechanism. HARQ can use different versions, types, or configurations. For example, in incremental redundancy HARQ, when a receiver (e.g., transceiver) detects erroneous data, the receiver (e.g., eNB with a PUSCH) may not discard the data. The receiver of the data may transmit a NACK if some erroneous data is detected. The sender can send the same data again but with a different set of coded bits (e.g., different redundancy version). The receiver can combine the previously received erroneous data with new data from the sender. In this way the chances of successfully decoding the bits can improve with each transmission. The process can repeat as long as the receiver is not able to decode the data and a maximum packet air-interface delay has not been reached. A benefit of incremental redundancy HARQ is that with each re-transmission, the coding rate can be lowered. Whereas in other types of HARQ, a same coding rate may be used each re-transmission.

HARQ can include a process where a receiver combines a new transmission with each previous erroneous data from prior transmissions. A drawback to HARQ, however, can be too much control overhead in case of poor radio condition when a sender attempts many transmissions. TTI bundling provides an alternative mechanism of reducing HARQ signaling overhead by re-transmitting the erroneous data with new set of coded bits using redundancy versions (RVs). RVs can send few versions of the same set of bits in consecutive TTI and the node can send back a feedback indicator (e.g., HARQ ACK/NACK) when the node successfully decodes the bits.

In an example, the VoIP packet arrival rate can restrict a maximum number of TTIs that can be potentially allocated for transmission of one VoIP packet (including all HARQ retransmissions). An uplink VoIP traffic model can have a 20 ms VoIP packet arrival rate, where a maximum number of TTIs that may be assigned for transmission of one packet is equal to 20 with no overlap or concurrency between consecutive VoIP packets. The VoIP service can have a 50 ms constraint on the packet air-interface delay or latency. The packet air interface latency constraint can have a direct impact on the maximum number of HARQ retransmissions that can be allocated and a potential HARQ retransmission period (e.g., HARQ RTT).

For a legacy LTE PUSCH VoIP transmission, the TTI bundling mechanism for FDD can be illustrated in Table 1 and FIG. 3. A whole RLC SDU of a VoIP packet can be transmitted by the wireless device using one TTI bundle 220a that contains four consecutive subframes 202 (TTIs) in a PUSCH 206a. HARQ ACK/NACK 208a feedback can be provided by the node. The transmission can occupy a single physical resource block (1 PRB) in the frequency domain. The HARQ retransmission period 230a (e.g., HARQ RTT) for the TTI bundled allocations in FDD can equal 16 subframes. The 16 subframe HARQ RTT allows a maximum four retransmissions 250a, 252a, 254a, and 256a of the TTI bundle to be allocated to satisfy an air-interface VoIP latency constraint of 52 subframes. So in scenario using all four retransmissions, a maximum of 16 TTIs can be used for a transmission (e.g., PUSCH) of one VoIP packet.

PUSCH hopping (in Table 1) can refer to mechanism to improve the uplink performance by providing frequency diversity and interference averaging. The PUSCH hopping can be between subframes (inter-subframe) or within a subframe (intra-subframe). RLC segmentation allows segmentation and reassembly of upper layer packets in order to adapt the upper layer packets to a size which can actually be transmitted over a radio interface. In RLC segmentation, the wireless device can segment RLC SDUs and transmit the segments in consecutive TTIs. However, RLC segmentation can increase overhead, control signaling, and vulnerability to packet loss due to HARQ feedback errors. TTI bundling can provide an alternative to RLC segmentation, or TTI bundling can be used in conjunction with RLC segmentation.

TABLE 1

| | |
|---|---|
| Max number of HARQ retransmissions | 4 |
| PUSCH hopping | ON |
| Number of UL RBs | 1 |
| Modulation/TBS | QPSK/328 bits |
| TTI Bundling | ON (4 TTIs) |
| RLC Segmentation | OFF |
| Total number of TTIs | 16 |

FIG. 3 illustrates a TTI bundling solution for FDD. The bundle size can be fixed to 4 transmissions with 4 redundancy versions (RVs) of a transport block (TB) resulting from a single RLC SDU, which can be transmitted in consecutive TTIs with HARQ process 204 number 0. In an example, one packet (e.g., VoIP packet or RLC SDU) can correspond to one HARQ process. A number of HARQ processes can refer to the number of HARQ processes that can be transmitted within a HARQ RTT (or the TTI bundle if a single HARQ retransmission is used for the packet). In another example, the number of HARQ processes can refer to the number of HARQ processes that can be transmitted within a packet air interface latency time interval. After all 4 transmissions have been received and decoded by the node (e.g., eNB); HARQ feedback can be sent to the wireless device. In an example, the PUSCH transmission can have up to 1 ms delay for PUSCH transmission and an up to 3 ms delay for decoding and processing the PUSCH by the node, so feedback can be possible in TTI #7 (or subframe 7). Again after an up to 1 ms delay for the HARQ ACK/NACK transmission and an up to 3 ms delay for decoding and processing the HARQ ACK/NACK by the wireless device (e.g., UE), the wireless device can receive the feedback on the PUSCH. So an earliest HARQ retransmission of the packet by the wireless device can be possible in TTI #11 or subframe 12 (or TTI #11 or subframe 11 when HARQ ACK/NACK decoding and processing is less than 2 ms). Thus, a shortest HARQ RTT with the bundle size of 4 can be 12 ms (or 11 ms).

In an example, the wireless device can provide cyclic redundancy check (CRC) 210, coding 212, and rate matching (RM) 214 and generate several redundancy versions (e.g., RV0, RV1, RV2, and RV3) for the TTIs in the TTI bundle. Several redundancy versions (RVs) corresponding to the entire RLC SDU can be transmitted in consecutive TTIs of the TTI bundle. When the last redundancy version of the TTI bundle (e.g., transport block) is received by the node (e.g., eNB), the HARQ feedback can be sent to the wireless device.

An improvement of the legacy LTE PUSCH VoIP transmission design based on the TTI bundling mechanism can increase an amount of energy transmitted per information bit, which can provide an uplink coverage enhancement. For example, legacy PUSCH VoIP transmission may use 16 TTIs out of a maximum 20 TTIs that may be available for transmission of one VoIP packet. An improvement can be to increase the TTI bundle size so all the HARQ retransmissions use the 20 TTIs available for the transmission of one VoIP packet.

The TTI bundling mechanism can be modified using various methods to improve the PUSCH transmission (e.g., PUSCH VoIP transmission). The TTI bundling mechanism can be modified to maximize the coverage performance for the uplink services (e.g., uplink VoIP services) by an efficient usage of the available resources and maximizing time and/or frequency diversity of the transmissions. In an example, the TTI bundling mechanism can be modified to reduce the HARQ retransmission period (i.e., HARQ RTT) and/or increase the TTI bundle size.

Figure 4:
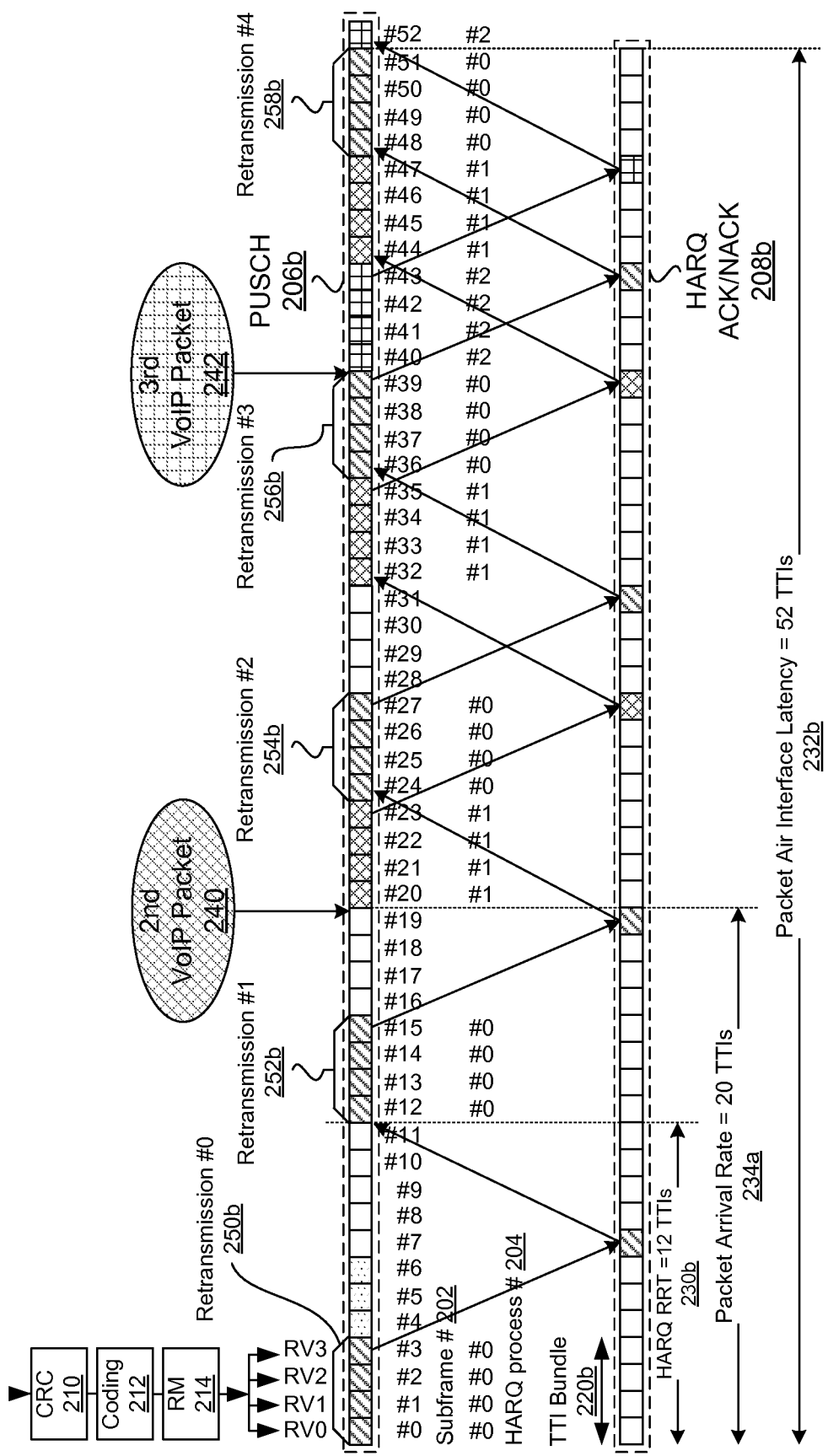
FIG. 4 illustrates a block diagram of a bundle with 4 contiguous transmission time intervals (TTIs) and a 12 subframe TTI bundle retransmission delay in accordance with an example.

FIG. 4 illustrates a TTI bundling enhancement by reducing the HARQ retransmission period (i.e., HARQ RTT 230$b$) for a PUSCH 206$b$ with an associated HARQ ACK/NACK 208$b$. The legacy TTI bundle retransmission delay may be reduced from 16 subframes to 12 subframes. As a result, 5 TTI bundles 220$b$ (i.e., 5 retransmissions 250$b$, 252$b$, 254$b$, 256$b$, and 258$b$) each with 4 TTIs (i.e. 20 TTIs in total) can be transmitted in a 52 ms (i.e., 52 subframes) packet air-interface latency 232$b$ time interval. If all five retransmission are used for each VoIP packet, a hundred percent (100%) subframe utilization can be achieved using all 20 TTIs. The reduced retransmission period solution (i.e., solution 1) of FIG. 4 can be represented as "4 TTIs, 5 ReTx" where "# TTIs" represents the TTI bundle size and "# ReTx" represents a maximum number of HARQ retransmissions. The reduced retransmission period solution can retain a packet arrival rate 234$a$ of 20 TTIs where the number of HARQ processes used may be 3 instead of 4.

Figure 5:
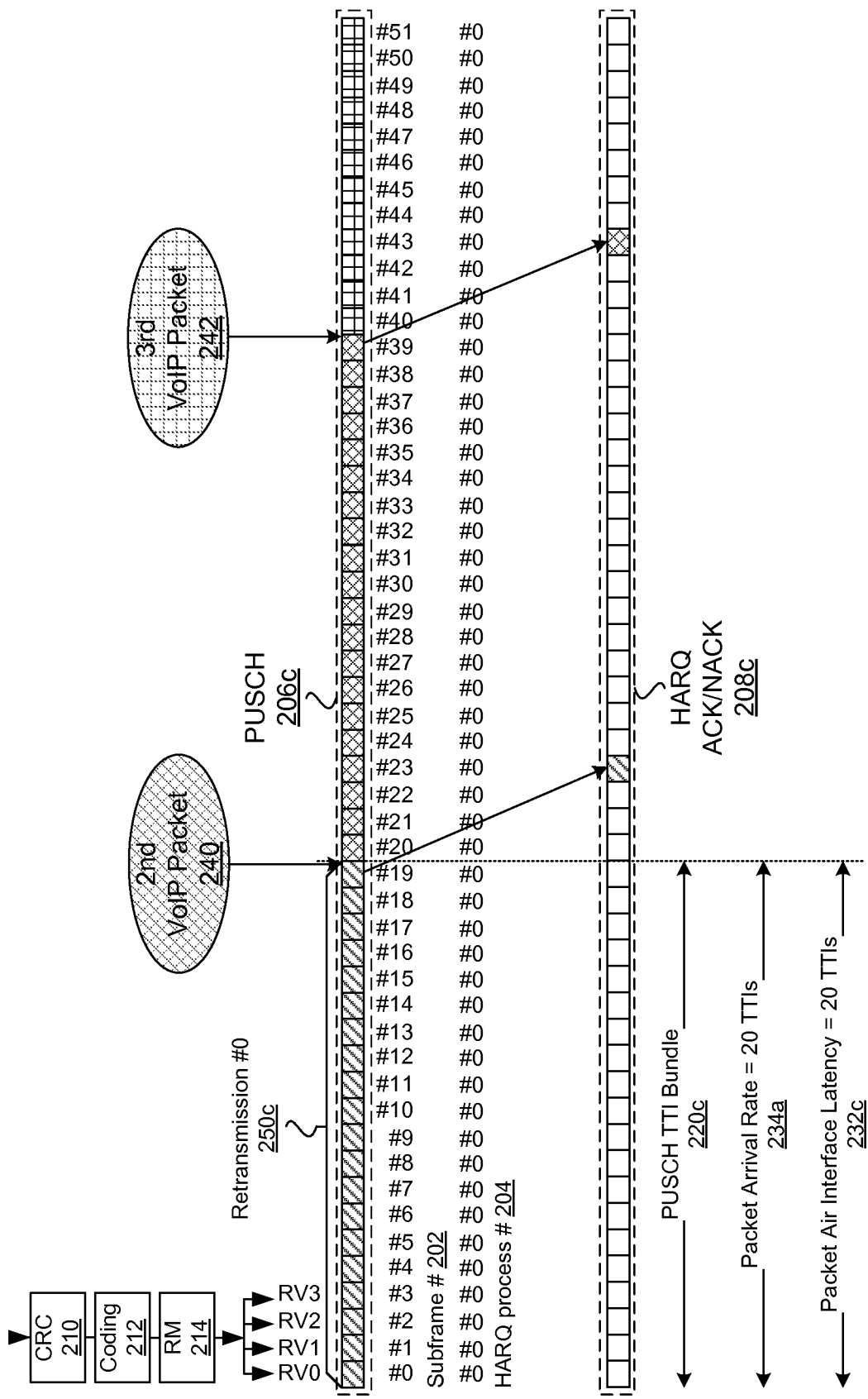
FIG. 5 illustrates a block diagram of a bundle with 20 contiguous transmission time intervals (TTIs) and a hybrid automatic repeat request (HARQ) ACKnowledgement/Negative ACKnowledgment (ACK/NACK) in accordance with an example.
Figure 6:
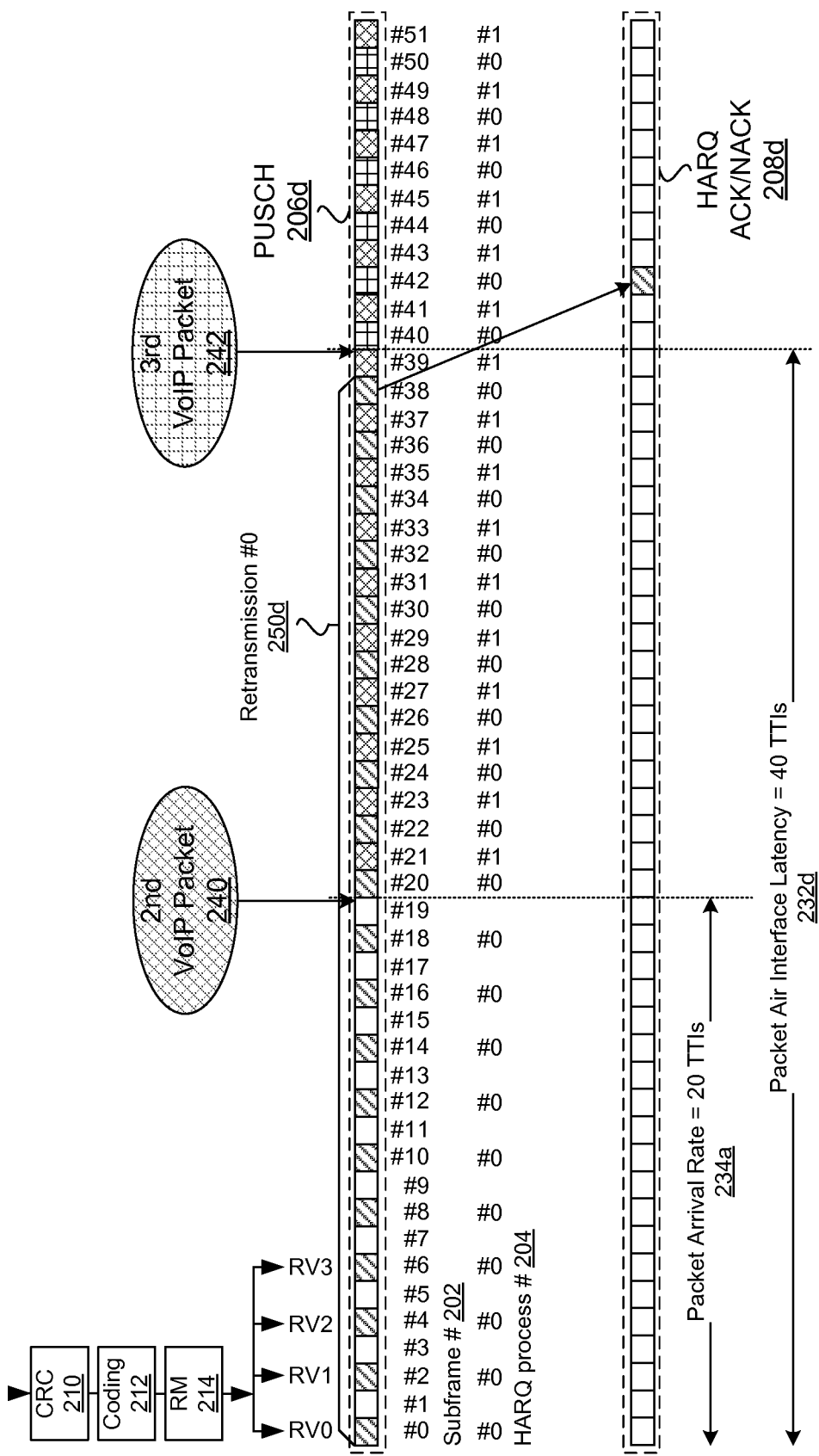
FIG. 6 illustrates a block diagram of a bundle with 20 interleaved transmission time intervals (TTIs) and a hybrid automatic repeat request (HARQ) ACKnowledgement/Negative ACKnowledgment (ACK/NACK) in accordance with an example.

Alternatively, a default 4 TTI bundle size may be increased. For example, a PUSCH TTI bundle size can be extended (i.e., solution 2) to 20, 10, or 8 TTIs. FIGS. 5-8 illustrate TTI bundling enhancements by extending the TTI bundle size to 20 TTIs. In an example, the increase of one TTI bundle size up to 20 TTIs can increase the total number of TTIs that can be used for VoIP packet transmission (e.g., 20 TTIs instead 16 TTIs in the legacy PUSCH transmission). The TTI bundle with 20 TTIs may be implemented as a contiguous TTI bundling allocation, as shown in FIG. 5, or as an interleaved TTI bundling allocation, as shown in FIG. 6.

FIG. 5 illustrates a TTI bundle 220$c$ size of 20 contiguous TTIs with a single HARQ transmission 250$c$ for a PUSCH 206$c$ with a single HARQ ACK/NACK 208$c$ for each TTI bundle. The TTI bundle with 20 contiguous TTIs can use a single HARQ process because all the TTIs for a packet may be used in a single transmission. The TTI bundle with 20 contiguous TTIs can be transmitted with a 20 TTI packet air-interface latency 232$c$, which is within an approximately 50 subframe time interval constraint for VoIP service. The solution (i.e., solution 2) of FIG. 5 can be represented as "20 TTIs, 1 ReTx, Contiguous TTI allocation" where "Contiguous TTI allocation" represents a TTI bundle with contiguous TTIs.

FIG. 6 illustrates a TTI bundle 220$d$ size of 20 interleaved TTIs with a single HARQ transmission 250$d$ for a PUSCH 206$d$ with a single HARQ ACK/NACK 208$d$ for each TTI bundle. Each interleaved TTI can be separated by a TTI not in the PUSCH TTI bundle. The TTI bundle with 20 interleaved TTIs can use and two HARQ processes because the TTIs for a packet can be interleaved with TTIs of another packet or process. The TTI bundle with 20 interleaved TTIs can be transmitted with a 40 (or 39) TTI packet air-interface latency 232$d$, which is within an approximately 50 subframe time interval constraint for VoIP service. The extended bundle size solution using 20 and 10 TTIs for the TTI bundle can retain a packet arrival rate 234$a$ of 20 TTIs. The solution (i.e., solution 2) of FIG. 6 can be represented as "20 TTIs, 1 ReTx, Interleaved TTI allocation" where "Interleaved TTI allocation" represents a TTI bundle with interleaved TTIs.

Figure 8:
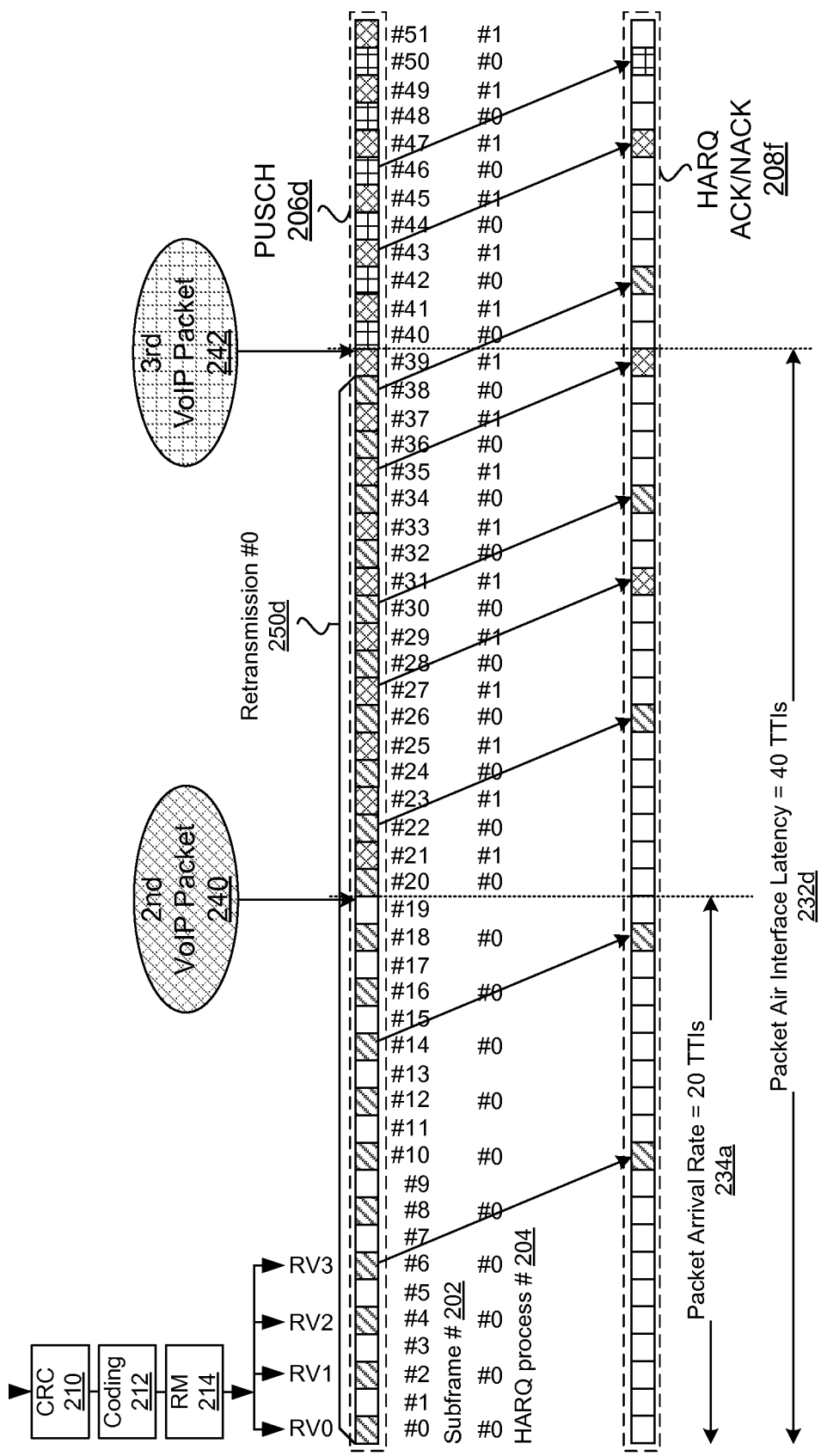
FIG. 8 illustrates a block diagram of a bundle with 20 interleaved transmission time intervals (TTIs) and a plurality of hybrid automatic repeat request (HARQ) ACKnowledgements/Negative ACKnowledgments (ACK/NACKs) in accordance with an example.

In case of interleaved allocation as illustrated in FIGS. 6 and 8, the TTIs of the TTI bundle can be interleaved with empty subframes or subframes carrying other packets (e.g., VoIP packets). The interleaved TTI bundle can increase transmission interval 250$d$ (from 20 TTIs to 40 TTIs) and channel time/frequency diversity at the expense of the VoIP air-interface latency 232$d$. For instance, the interleaved TTI bundling pattern may be designed to maximize the frequency diversity of the associated PUSCH transmission. A PUSCH frequency hopping mechanism (used with TTI bundling) be implemented by designing an allocation pattern to include subframes from different frames such that all physical subframe indexes (i.e., 0-9) are present, instead of just the odd or even subframe indexes (as shown in FIGS. 6 and 8).

Figure 7:
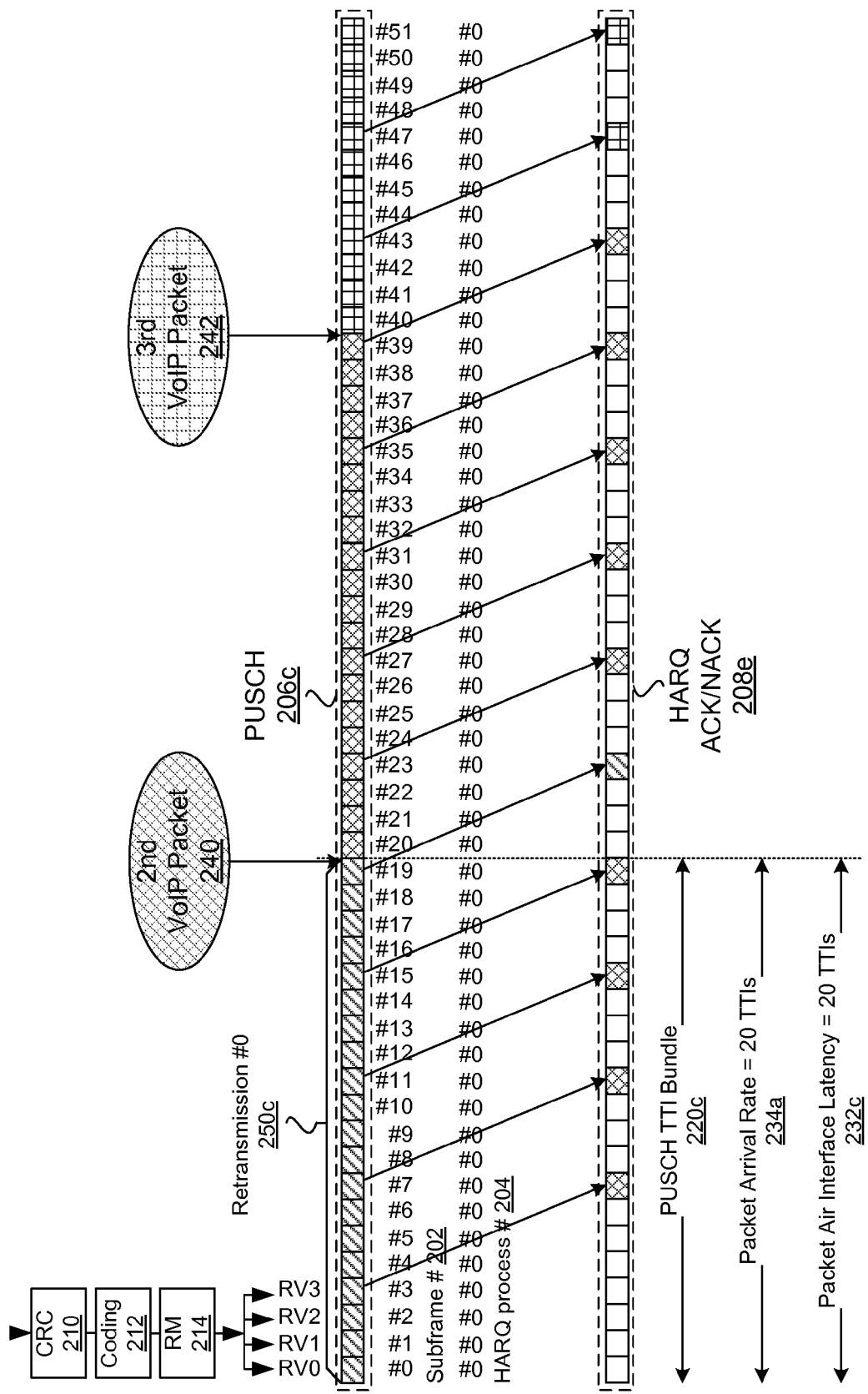
FIG. 7 illustrates a block diagram of a bundle with 20 contiguous transmission time intervals (TTIs) and a plurality of hybrid automatic repeat request (HARQ) ACKnowledgements/Negative ACKnowledgments (ACK/NACKs) in accordance with an example.

The contiguous or interleaved TTI bundling allocation can be alternatively interpreted as a consecutive transmission of five standard TTI bundles, as illustrated in FIG. 7 for a contiguous TTI bundle with 5 HARQ ACK/NACK 208$e$ for each contiguous TTI bundle and in FIG. 8 for an interleaved TTI bundle with 5 HARQ ACK/NACK 208$f$ for each interleaved TTI bundle. The TTI bundle with 20 contiguous TTIs can be characterized by a minimum latency of 20 TTIs 232$c$ (FIGS. 5 and 7), but the packet may experience a performance loss due to lack of time diversity.

The 20 TTI single transmission with a single HARQ ACK/ NACK may be too robust for some of the wireless devices. So in both contiguous and interleaved TTI bundling allocations cases, intermediate HARQ feedbacks 208e and 208f (e.g., one intermediate HARQ feedback per each 4 TTI) can be used to enable mechanisms of early termination of packet transmission (e.g., VoIP packet transmission) when a packet is successfully decoded, which can enable a more efficient resource utilization in the system, as illustrated in a modified contiguous solution of FIG. 7 and a modified interleaved solution of FIG. 8. The solution (i.e., solution 2) of FIG. 7 can be represented as "20 TTIs, 1 ReTx, Contiguous TTI allocation" with an early termination mechanism. The solution (i.e., solution 2) of FIG. 8 can be represented as "20 TTIs, 1 ReTx, Interleaved TTI allocation" with an early termination mechanism.

Figure 9:
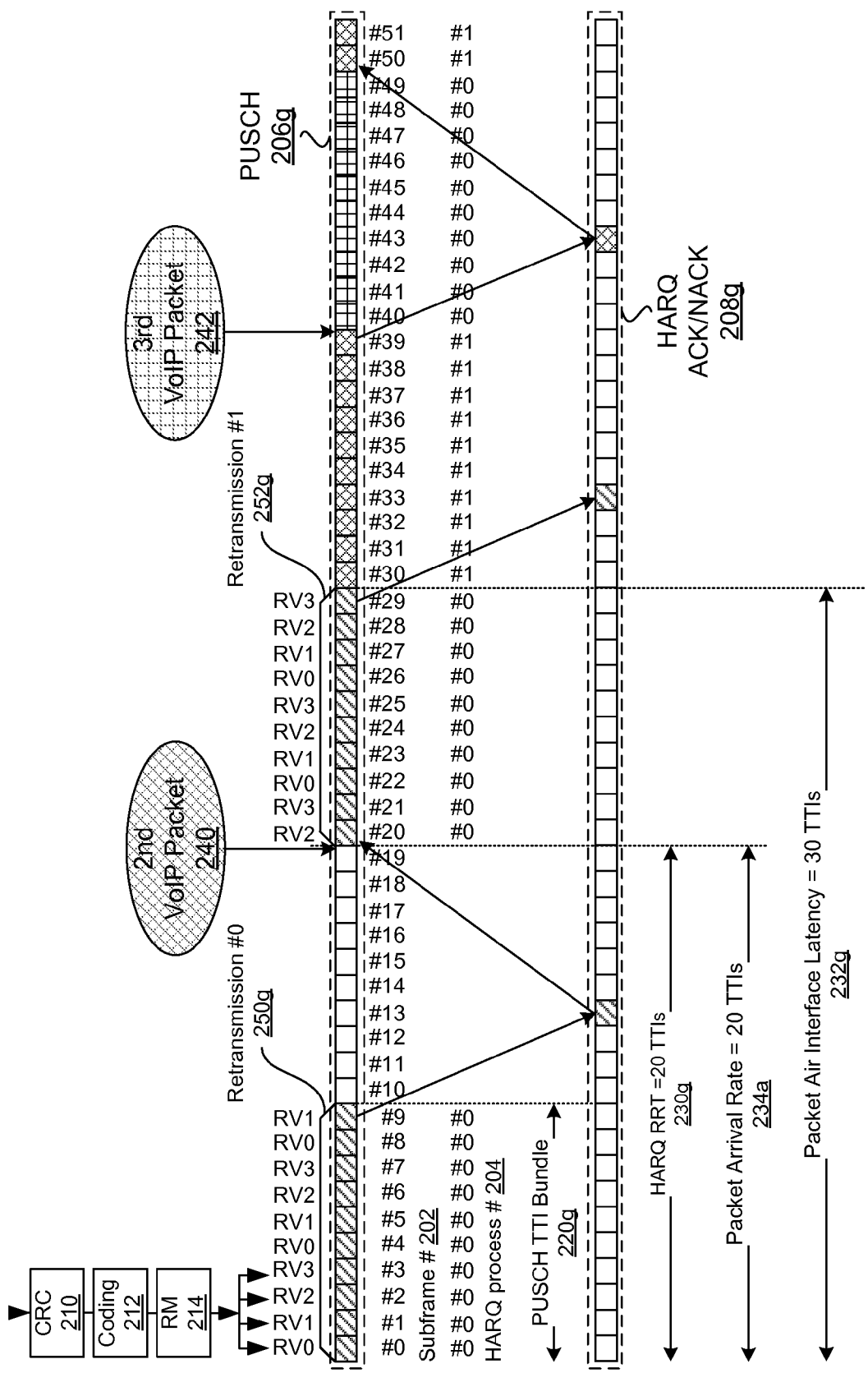
FIG. 9 illustrates a block diagram of a bundle with 10 contiguous transmission time intervals (TTIs) in accordance with an example.

The TTI bundle 220g size equal to 10 subframes can also be defined, as illustrated in FIG. 9. In an example, two HARQ retransmissions 250g and 252g of a PUSCH 206g may be used to stay within VoIP timing constraints, such as the approximately 50 subframe packet air-interface latency. The TTI bundle with 10 TTIs may also utilize the maximum number of TTIs (i.e., 20 TTIs). To align the HARQ retransmission time with a VoIP packet arrival rate and to meet VoIP timing constraints the retransmission period can be equal to 20 TTIs or 30 TTIs. FIG. 9 illustrates TTI bundling enhancements by extending the TTI bundle 220g size to 10 TTIs with 2 HARQ retransmissions 250g and 252g of the 10 TTIs for a total of 20 TTIs transmitted in a 30 ms (i.e., 30 subframes) packet air-interface latency 232g time interval. Each TTI bundle can be associated with a HARQ ACK/NACK 208g. If the 10 TTI bundling allocation uses a 30 subframe packet air-interface latency, the HARQ retransmission period (i.e., HARQ RTT 230b) can be 20 TTIs and the number of HARQ processes used may be 2, as shown in FIG. 9. If the 10 TTI bundling allocation uses a 40 subframe packet air-interface latency, the HARQ retransmission period can be 30 TTIs and the number of HARQ processes used may be 3 (not shown). The solution (i.e., solution 2) of FIG. 9 can be represented as "10 TTIs, 2 ReTx". FIG. 9 also illustrates a different RV configuration for a first retransmission 250g and a second retransmission 250h.

Figure 10:
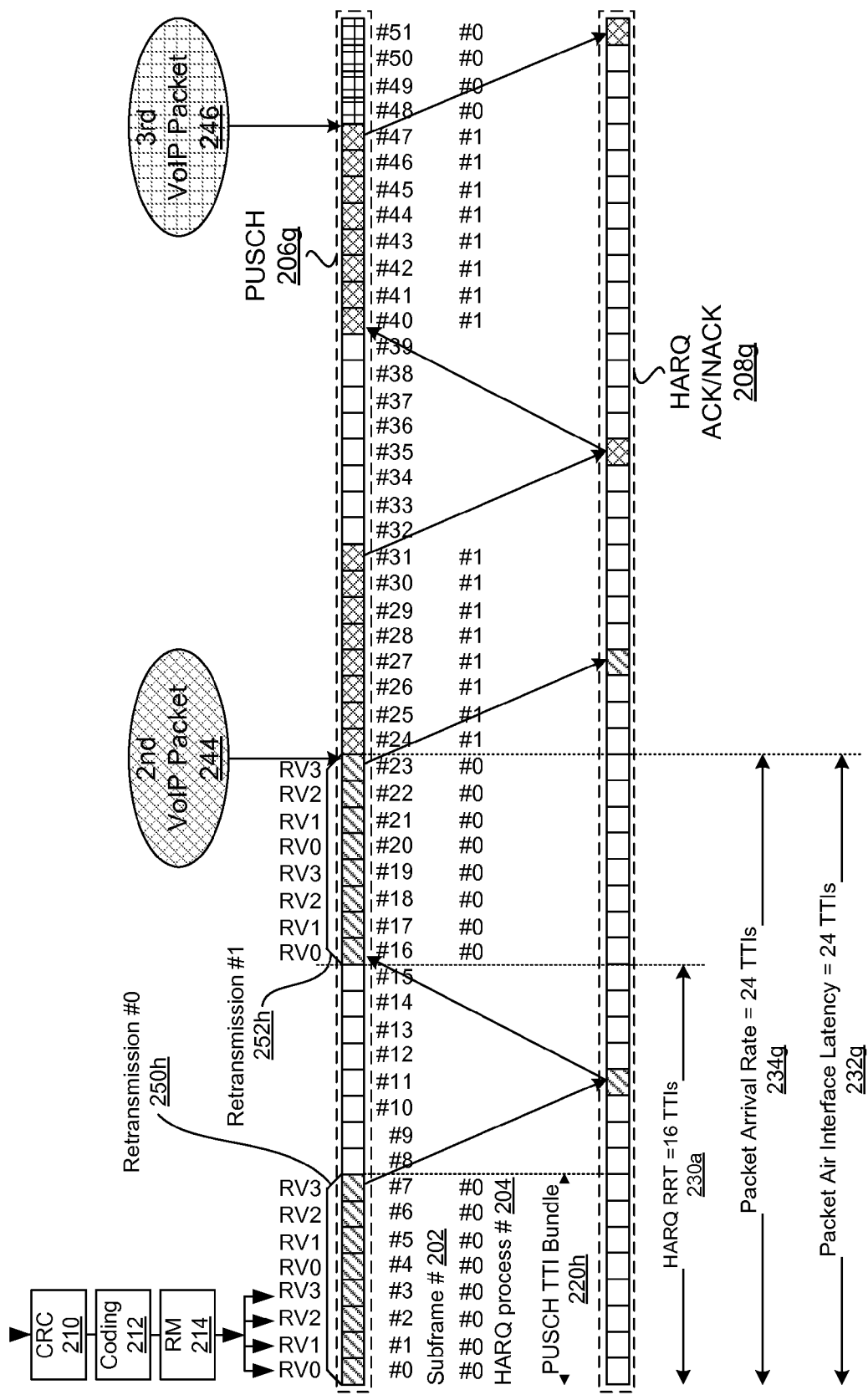
FIG. 10 illustrates a block diagram of a bundle with 8 contiguous transmission time intervals (TTIs) in accordance with an example.

The TTI bundle 220h size equal to 8 subframes can also be defined, as illustrated in FIG. 10. In an example, a maximum two HARQ retransmissions 250h and 252h for a PUSCH 206h may be used, thus only 16 TTIs may be used for VoIP packet transmission. Minimal to no additional transmission energy gain may be achieved when 16 TTIs are used for a packet instead of 20 TTIs, even with a different configuration, such as a TTI bundle with 8 TTIs. Using a legacy type HARQ timing, the latency of VoIP packet transmission may be reduced, which may cause performance loss due to lack of time diversity.

FIG. 10 illustrates TTI bundling enhancements by extending the TTI bundle 220h size to 8 TTIs with 2 HARQ retransmissions 250h and 252h of the 8 TTIs for a total of 16 TTIs transmitted in a 24 ms (i.e., 24 subframes) packet air-interface latency 232h time interval. Each TTI bundle can be associated with a HARQ ACK/NACK 208h. If the 8 TTI bundling allocation uses a 24 subframe packet air-interface latency, the HARQ retransmission period (i.e., HARQ RTT 230b) can be 16 TTIs and the number of HARQ processes used may be 2, as shown in FIG. 10. When the HARQ RTT equals 16 TTIs, the extended bundle size solution using 8 TTIs can use a packet arrival rate 234a of 24 TTIs (e.g., a second VoIP transmission 244 at subframe 24 and a third VoIP transmission 246 at subframe 48). If the 8 TTI bundling allocation uses a 32 subframe packet air-interface latency, the HARQ retransmission period can be 24 TTIs and the number of HARQ processes used may be 3 (not shown). When the HARQ RTT equals 24 TTIs, the extended bundle size solution using 8 TTIs can use a packet arrival rate 234a of 32 TTIs (not shown). The solution (i.e., solution 2) of FIG. 10 can be represented as "8 TTIs, 2 ReTx".

Some of the main features of the TTI bundling enhancement examples can be briefly summarized in Table 2.

TABLE 2

| Description | Number of TTIs per TTI bundle | Maximum number of HARQ ReTx | Number HARQ processes | VoIP Latency, subframes |
|---|---|---|---|---|
| Solution 1<br>4 TTIs × 5 ReTx | 4 | 5 | 3 | 52 |
| Solution 2<br>20 TTIs × 1 ReTx,<br>Contiguous pattern | 20 | 1 | 1 | 20 |
| Solution 2<br>20 TTIs × 1 ReTx,<br>Interleaved pattern | 20 | 1 | 2 | 40 |
| Solution 2<br>10 TTIs × 2 ReTx | 10 | 2 | 2/3 | 30-40 |
| Solution 2<br>8 TTIs × 2 ReTx | 8 | 2 | 2/3 | 24-32 |

The TTI bundling enhancement can apply to FDD and TDD mode. In TDD mode, the TTI bundling enhancement may be adapted to each TDD uplink-downlink (UL-DL) configuration. In FDD, a maximum number of TTIs allowed for each packet (e.g. VoIP packet) can be 20 TTIs. In LTE TDD, a maximum number of TTIs allowed for each packet (e.g. VoIP packet) can be a range between 2-12 TTIs, where each uplink subframe is allocated 2 TTIs. For example, UL-DL configuration 0 can have 6 uplink subframes (where the other 4 subframes are downlink or special), so 12 TTIs are available for the packet. Similarly, UL-DL configuration 5 can have 1 uplink subframes (where the other 9 subframes are downlink or special), so 2 TTIs are available for the packet. In FDD, all 10 subframes of a radio frame are allocated to uplink, so 20 TTIs are available for the packet. In LTE TDD, UL-DL configurations 0, 1, 2, 3, 4, 5, and 6 can have 6, 4, 2, 3, 2, 1, and 5 uplink subframes, respectively, corresponding to a maximum number of available TTIs of 12, 8, 4, 6, 4, 2, and 10 TTIs, respectively. UL-DL configurations 0, 3 and 6 can be improved based on modifications to the TTI bundling enhancement because the maximum number of available TTIs may not be used while still operating within an air-interface latency of less than approximately 50 subframes (i.e., 50 ms).

In addition to TTI bundling enhancements of reducing the HARQ retransmission period (i.e., HARQ RTT) or increasing the TTI bundle size, a set of redundancy versions redundancy versions (RVs) transmitted in each TTI may be further optimized. For example, the legacy TTI bundling mechanism can use different redundancy versions of the transport block, which may be transmitted in different consecutive TTIs. For example, if a total of 4 possible RVs (e.g., RV0, RV1, RV2, and RV3) are used, different RVs can be assigned to the TTIs in one TTI bundle and then the same RV pattern can be repeated for the HARQ retransmissions of a TTI bundle, which can work for TTI bundles with 4 TTIs.

For the scenarios when the TTI bundle size is increased, the potential improvements may include a certain RV pattern and/or assignment rule used to set the RVs for each TTI in a TTI bundle. For example, the repetition of a {RV0, RV1, RV2, RV3} or {RV0, RV2, RV3, RV1} patterns may be used in the initial retransmission or subsequent transmissions with a different pattern in other transmissions (e.g., the initial retransmission or subsequent transmissions). Other enhanced patterns may also be used.

In convolutional turbo codes (CTC), systematic bits can be of higher importance for decoding process. So, in an example, instead of using simple consecutive repetition of all redundancy versions {RV0, RV1, RV2, RV3}, the redundancy version 0 (RV0) or redundancy version 2 (RV2) may be transmitted more often to get an additional improvement and provide further optimization. In an example, the use of RV0 or RV2 more frequency than other RVs can be applicable to various TTI bundling solution, including the legacy TTI bundling (with a TTI bundle of 4TTs and a 16 subframe HARQ RTT) and solutions 1 and 2.

Figure 11:
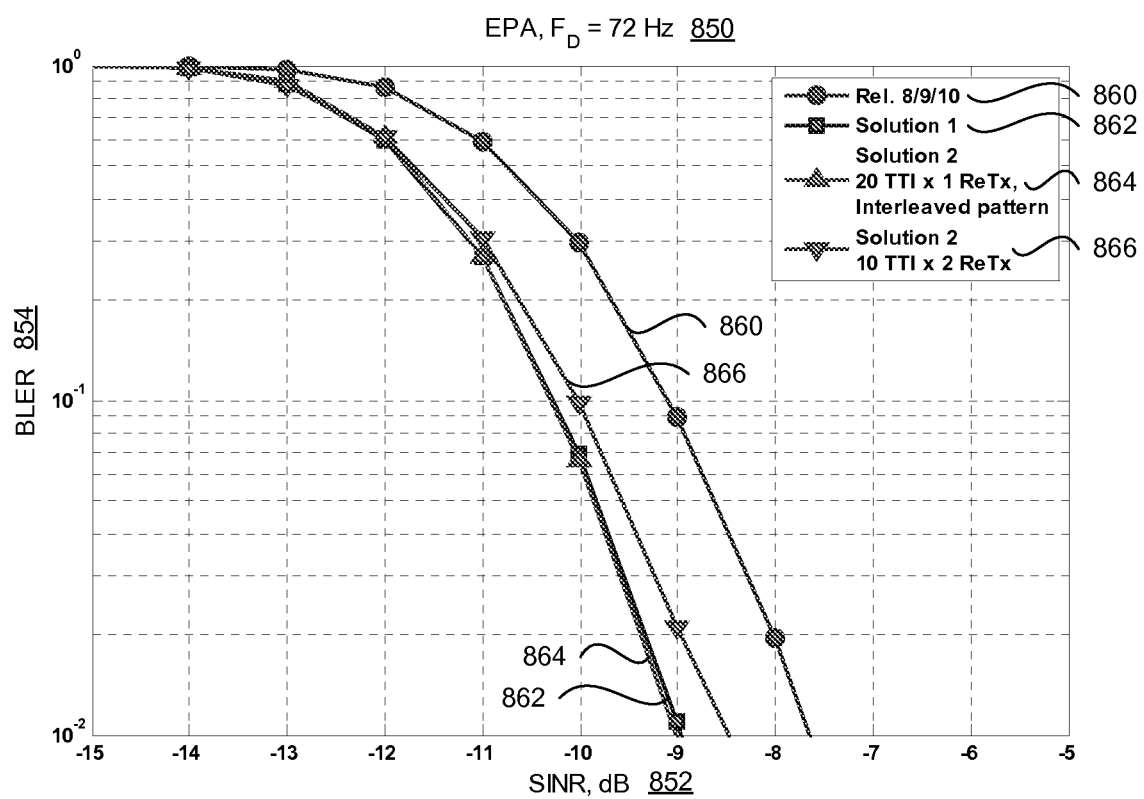
FIG. 11 illustrates a block error rate (BLER) and signal-to-noise-and-interference ratio (SINR) comparison of various transmission time interval (TTI) bundling configurations using an extended pedestrian A model (EPA) in accordance with an example.

FIG. 11 and Table 3 illustrate link-level evaluations and compare the performance of the TTI bundling enhancements with the legacy TTI bundling for a LTE PUSCH VoIP transmission scheme. An example performance of the legacy LTE PUSCH VoIP transmission scheme and the PUSCH transmission schemes based on the TTI bundling enhancement (e.g., solutions 1 and 2) can be shown in FIG. 11. Table 3 illustrates an example performance using legacy TTI bundling and TTI bundling enhancement in frequency flat (additive white Gaussian noise (AWGN)) and frequency selective channels (extended pedestrian A model (EPA) and extended typical urban model (ETU)). The set of Doppler frequencies $F_D=\{0, 7.2$ Hertz (Hz), 72 Hz$\}$ can be used to model different user mobility scenarios (e.g., 0 km/h, 3 km/h, and 30 km/h, respectively) and check the sensitivity of uplink VoIP transmission to time diversity. The example performance uses a 1 PRB resource allocation and transport block size of 328 bits. The results of block error rate (BLER) link level example simulations can be summarized in Table 3, which can also be shown graphically in FIG. 11. The residual BLER requirement equal to 2×10−2 has been applied to the illustrated examples. The example of FIG. 11 and Table 3 uses the ideal channel knowledge in link level analysis to exclude the effect of channel estimation error and check potential coverage gains. FIG. 11 compares the BLER 854 versus the signal-to-noise ratio (SNR) or signal to interference plus noise ratio (SINR) 852 for EPA with $F_D=72$ Hz 850. Coverage enhancement solutions of solution 1 862, solution 2 with 20 interleaved TTIs 864, and solution 2 with 10 TTIs 866 were compared with the legacy TTI bundling allocation 860 (i.e., LTE Rel. Aug. 9, 2010). Table 3 provides a SNR/MCL performance summary of the coverage enhancement solutions and the legacy TTI bundling allocation.

TABLE 3

| Scheme | Stationary 0 km/h, $F_D = 0$ Hz | | Low Mobility 3 km/h, $F_D = 7.2$ Hz | | High Mobility 30 km/h, $F_D = 72$ Hz | |
|---|---|---|---|---|---|---|
| | AWGN | EPA ETU | EPA | ETU | EPA | ETU |
| Legacy LTE (SNR, dB @ Residual BLER 2 · 10−2) | | | | | | |
| Legacy TTI Bundling w/o Segmentation | −10.7 | −3.2 −5.6 | −5.9 | −6.9 | −8.0 | −8.3 |
| Relative SNR/MCL gains | | | | | | |
| Solution 1 4 TTIs × 5 ReTx | 1.0 | 1.2 0.8 | 0.8 | 1.1 | 1.3 | 1.2 |

TABLE 3-continued

| Scheme | Stationary 0 km/h, $F_D = 0$ Hz | Low Mobility 3 km/h, $F_D = 7.2$ Hz | | High Mobility 30 km/h, $F_D = 72$ Hz | |
|---|---|---|---|---|---|
| | AWGN | EPA | ETU | EPA | ETU | EPA | ETU |
| Solution 2 20 TTIs × 1 ReTx w/ interleaving | 1.0 | 0.8 | 0.4 | 0.0 | 0.3 | 1.4 | 1.1 |
| Solution 2 10 TTIs × 2 ReTx | 1.0 | 1.3 | 0.7 | 0.0 | 0.4 | 1.0 | 0.9 |

The analysis of the simulation results illustrated in FIG. 11 and Table 3, can show that in a frequency flat AWGN channel, the various considered schemes can provide a 1 dB gain when the total number of TTIs is increased from 16 TTIs to 20 TTIs. Thus, the energy per information bit can be increased by approximately 1 dB. In frequency selective channels, the performance of the proposed TTI bundling enhancement schemes can depend on a user mobility scenario. For example, in stationary scenario (EPA and ETU with $F_D=0$ Hz) the relative SNR gains can vary from 0.4 up to 1.3 dB. Two solutions (e.g., 4TTI, 5 ReTx and 10TTIs, 2ReTx) can show superior performance. In an EPA channel model the relative SNR gains of solution 1 and solution 2 with 10 TTIs can slightly exceed a 1 dB improvement target. In low mobility scenarios (EPA and ETU with $F_D=7.2$ Hz), the observed relative SNR gains can be below 1 dB, which may be due to the lack of channel time diversity due to a shorter time transmission interval of the considered schemes. In high mobility scenarios (EPA and ETU with $F_D=72$ Hz), the observed relative SNR gains can slightly exceed 1 dB (e.g., 0.9-1.4 dB). The SNR improvement can be due to increased channel variation in time domain and thus utilization of a channel time diversity property.

In another example, an adaptive choice of the TTI bundling configuration can be selected on a wireless device (e.g., UE) basis. Adaptive UE specific TTI bundling can be used to improve coverage and system performance of a service (e.g., VoIP service). For example, the number of subframes in a TTI bundle can be set adaptively as a part of a link adaptation procedure by taking into account a delay budget and preserving the HARQ timing operation. Different link budgets can be used for different wireless devices (e.g., UEs) to compensate for the coverage gap that wireless device may have. For instance, if a node (e.g., eNB) is in a deep shadowing, then a longer transmission duration can help the node to accumulate signal energy per information bit and decode the signal (e.g., PUSCH). In a power limited mode, the allocation bandwidth may be reduced to increase the signal power spectral density and longer TTI bundling can be applied to increase the SNR. The VoIP service can be a low rate service so that transmission in one physical resource block at a maximum power can provide a maximum power spectral density while maintaining throughput requirements. Adaptive TTI bundling can be performed by adaptively changing a UE specific TTI bundle size based on link adaptation (i.e., adaptive TTI bundling extension) or adaptive combining of HARQ processes.

Adaptive TTI bundling extension can be used to adaptively define the UE specific TTI bundle size based on link adaptation and use more TTIs for wireless devices (e.g., UEs) that experience poor coverage. For example, to be aligned with a legacy LTE HARQ timing operation, the TTI bundling can include 4, 8, 12, 16, or 20 subframes.

In adaptive combining of HARQ processes, several HARQ processes (e.g., parallel HARQ processes) can be used to transmit TTI bundles (each bundle includes at least four subframes) with the same information bits sequentially in time without waiting the ACK/NACK feedback from the node (e.g., eNB). The TTI bundles can carry signals with different redundancy versions or use simple sequence repetition (e.g., with a same RV version pattern). In adaptive combining of HARQ processes, the node can inform the wireless devices which HARQ processes carry the same information bits.

The TTI bundling enhancements, which can include a reduced retransmission period (i.e., solution 1), an extended TTI bundle size (i.e., solution 2), a modification of the RVs, or adaptive UE specific TTI bundling, can provide an improvement of the LTE PUSCH VoIP transmissions designs, which can generate an approximately 1 dB coverage performance gain compared to a legacy LTE solutions (e.g., legacy TTI bundling allocation).

Figure 12:
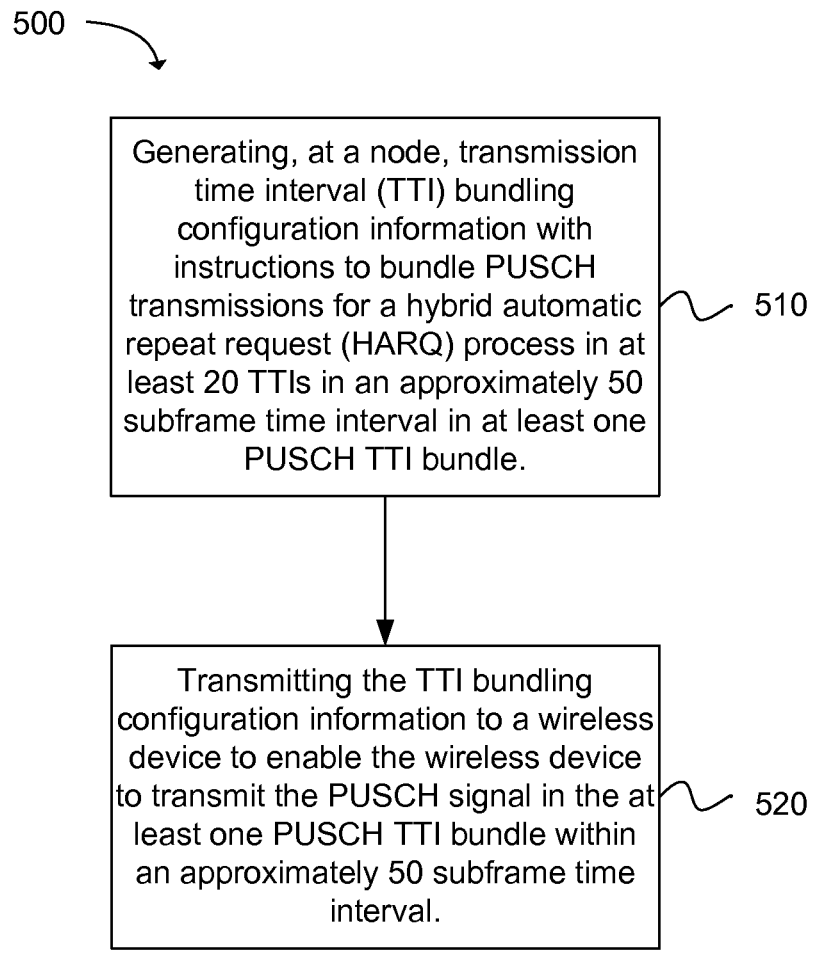
FIG. 12 depicts a flow chart of a method for organizing physical uplink shared channel (PUSCH) transmissions in accordance with an example.

Another example provides a method 500 for organizing physical uplink shared channel (PUSCH) transmissions, as shown in the flow chart in FIG. 12. The method may be executed as instructions on a machine, where the instructions are included on at least one computer readable medium. The method includes the operation of generating, at a node, transmission time interval (TTI) bundling configuration information with instructions to bundle PUSCH transmissions for a hybrid automatic repeat request (HARQ) process in at least 20 TTIs in an approximately 50 subframe time interval in at least one PUSCH TTI bundle, as in block 510. The operation of transmitting the TTI bundling configuration information to a wireless device to enable the wireless device to transmit a PUSCH signal in the at least one PUSCH TTI bundle within an approximately 50 subframe time interval follows, as in block 520.

In an example, the approximately 50 subframe time interval can represent a voice over internet protocol (VoIP) air-interface latency constraint for each packet, the at least 20 TTIs can be a maximum number of TTIs allocated to each packet, and each packet can have a VoIP packet arrival rate of 20 TTIs. Each TTI can include a one millisecond (ms) subframe of a radio frame. At least part of the TTI bundling configuration information can be transmitted to the wireless device via higher layer signaling, such as radio resource control (RRC) signaling.

In a configuration, each PUSCH TTI bundle can include 4 contiguous TTIs with a 12 subframe TTI bundle retransmission delay where up to 5 HARQ retransmissions for the wireless device can occur within the approximately 50 subframe time interval (e.g., 52 subframe time interval). If all 5 HARQ retransmissions are not needed for decoding the PUSCH signal (e.g., the PUSCH signal can be properly decoded with fewer than 5 HARQ retransmissions), then less 20 TTIs may be used, so the node can transmit and the wireless device can receive at least one PUSCH TTI bundle "up to" the at least 20 TTIs. The term approximately can refer to plus or minus 10% of a nominal value (±10% tolerance). For example, approximately 50 subframe time interval can refer to a 45 to 55 subframe time interval. In an example, each PUSCH TTI bundle can include 4 contiguous TTIs and multiple physical resource blocks in a frequency domain. A HARQ feedback indicator can be associated with each received PUSCH TTI bundle, where the HARQ feedback indicator can include an ACKnowledgement (ACK) or a Negative ACKnowledgment (NACK). The node can send the HARQ feedback indicator to the wireless device for each received PUSCH TTI bundle. The PUSCH TTI bundle including the 4 contiguous TTIs with the 12 subframe TTI bundle retransmission delay can include up to 3 HARQ processes configured for one wireless device for a PUSCH TTI bundling mode operation.

In another configuration, each PUSCH TTI bundle can include 20 contiguous TTIs. A HARQ feedback indicator can be associated with the PUSCH TTI bundle or a plurality of intermediate HARQ feedback indicators can be associated with the PUSCH TTI bundle. Each HARQ feedback indicator can be configured to provide feedback for at least 4 TTIs in the PUSCH TTI bundle. For example, each intermediate HARQ feedback indicator can provide feedback (e.g., ACK/NACK) for at least 4 TTIs and a single HARQ feedback indicator can provide feedback for the 20 TTIs in the PUSCH TTI bundle. Each PUSCH TTI bundle can include 20 contiguous TTIs and multiple physical resource blocks in a frequency domain. The 20 contiguous TTIs can include one HARQ processes configured for one wireless device for a PUSCH TTI bundling mode operation.

In another configuration, each PUSCH TTI bundle can include 20 interleaved TTIs. Each interleaved TTI can be separated by a TTI not in the PUSCH TTI bundle. A HARQ feedback indicator can be associated with the PUSCH TTI bundle or a plurality of intermediate HARQ feedback indicators can be associated with the PUSCH TTI bundle. Each HARQ feedback indicator can be configured to provide feedback for at least 4 TTIs in the PUSCH TTI bundle. Each PUSCH TTI bundle can include 20 interleaved TTIs and multiple physical resource blocks in a frequency domain. The 20 interleaved TTIs can include two HARQ processes configured for different wireless devices for a PUSCH TTI bundling mode operation.

In another configuration, each PUSCH TTI bundle can include 10 contiguous TTIs with a 20 subframe TTI bundle retransmission delay or a 30 subframe TTI bundle retransmission delay. A HARQ feedback indicator can be associated with each received PUSCH TTI bundle, where the HARQ feedback indicator can include an ACK or a NACK. The node can send the HARQ feedback indicator to the wireless device for each received PUSCH TTI bundle. For the 20 subframe TTI bundle retransmission delay, two HARQ processes can be configured for different wireless devices for PUSCH TTI bundling mode operation. For the 30 subframe TTI bundle retransmission delay, three HARQ processes can be configured for different wireless devices for PUSCH TTI bundling mode operation.

In another example, the PUSCH TTI bundle corresponding to an initial HARQ transmission and the PUSCH TTI bundle corresponding to a subsequent HARQ retransmission can occupy a different number of TTIs. For example, the PUSCH TTI bundle corresponding to the initial HARQ transmission can include 8 TTIs (contiguous or interleaved) and the PUSCH TTI bundle corresponding to a subsequent HARQ retransmission can include 4 TTIs (contiguous or interleaved). In an example, each PUSCH TTI bundle can be associated with one instance of an initial PUSCH transmission or a subsequent HARQ retransmission of a PUSCH transmission. The initial and subsequent HARQ retransmissions can have different TTI bundle sizes or configurations. In another example, the PUSCH TTI bundle corresponding to the initial PUSCH transmission can include 8 contiguous TTIs, and a remaining PUSCH TTI bundles corresponding to HARQ retransmissions can include 4 contiguous TTIs with a 16 subframe TTI bundle retransmission delay.

In another configuration, a PUSCH TTI bundle can carry different redundancy versions (RVs) to maximize mutual information and extract maximum coding and diversity gain of TTI bundled transmission and retransmissions. For example, a number of TTIs for the PUSCH TTI bundle can include a redundancy version (RV) 0 which is greater than a number of TTIs with RV1 or RV3, or the number of TTIs with a RV2 can be greater than the number of TTIs with RV1 or RV3 for the PUSCH TTI bundle. For instance, for 10 contiguous TTIs in the PUSCH TTI bundle, three TTIs can have a RV0, two TTIs can have a RV1, three TTIs can have a RV2, and two TTIs can have a RV3.

The method can further include the node adaptively configuring a user equipment (UE) specific TTI bundle size based on link adaptation information. Each TTI bundle can include a TTI bundle size of 4, 8, 10, 12, 16, or 20 subframes, and the TTI bundling configuration information can include the TTI bundle size.

In another configuration, the method can further include the node adaptively combining at least two hybrid automatic repeat request (HARQ) processes. Each HARQ process can include the PUSCH TTI bundle, and the TTI bundling configuration information can include redundancy version (RV) information or simple sequence repetition information for each TTI bundle.

In another example, the method can further include the node receiving from the wireless device a PUSCH signal transmission including the at least one PUSCH TTI bundle within an approximately 50 subframe time interval, decoding data from the received PUSCH signal, and transmitting at least one hybrid automatic repeat request-acknowledgement (HARQ-ACK) feedback to the wireless device based on the TTI bundling configuration information and the decoded data.

Figure 13:
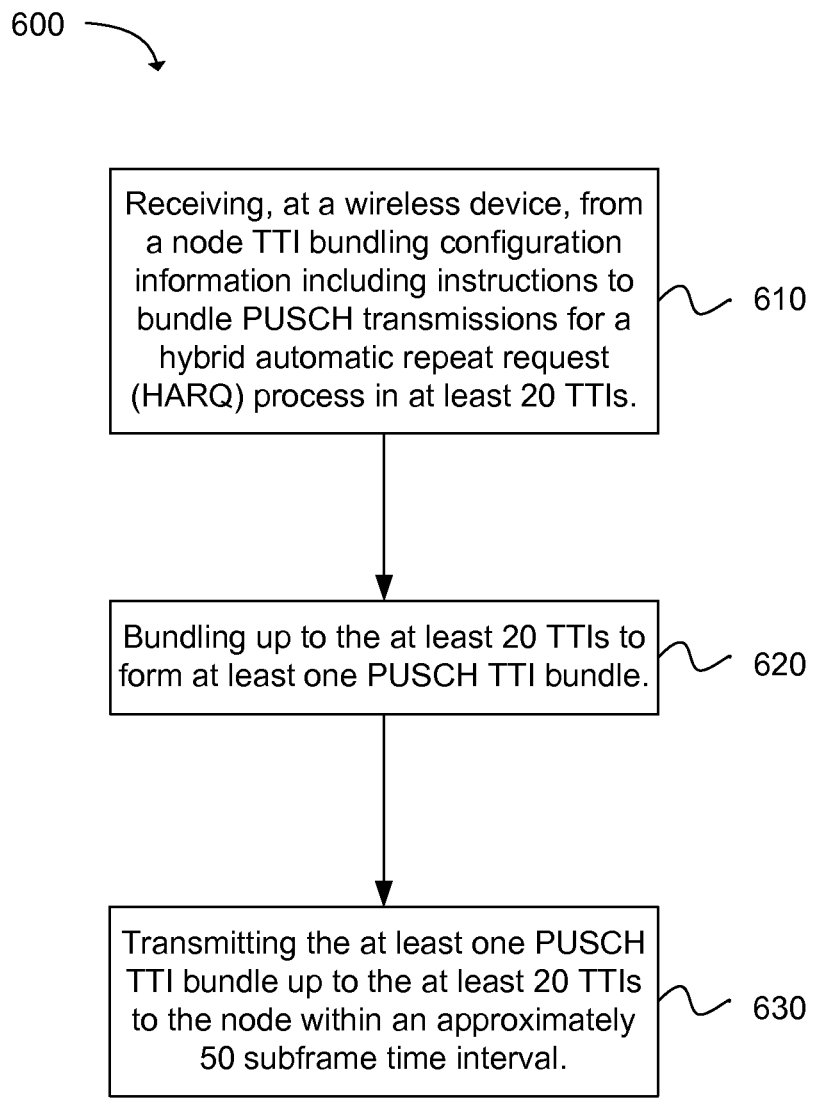
FIG. 13 depicts a flow chart of a method for physical uplink shared channel (PUSCH) transmission time interval (TTI) bundling in accordance with an example.

Another example provides a method 600 for physical uplink shared channel (PUSCH) transmission time interval (TTI) bundling, as shown in the flow chart in FIG. 13. The method may be executed as instructions on a machine, where the instructions are included on at least one computer readable medium or one non-transitory machine readable storage medium. The method includes the operation of receiving, at a wireless device, from a node TTI bundling configuration information including instructions to bundle PUSCH transmissions for a hybrid automatic repeat request (HARQ) process in at least 20 TTIs, as in block 610. The operation of bundling up to the at least 20 TTIs to form at least one PUSCH TTI bundle follows, as in block 620. The next operation of the method can be transmitting the at least one PUSCH TTI bundle up to the at least 20 TTIs to the node within an approximately 50 subframe time interval, as in block 630.

In a configuration, each PUSCH TTI bundle can include 4 contiguous TTIs with a 12 subframe TTI bundle retransmission delay where up to 5 HARQ retransmissions for the wireless device. The approximately 50 subframe time interval can be 52 millisecond (ms). A HARQ feedback indicator can be associated with each received PUSCH TTI bundle, where the HARQ feedback indicator can include an ACK or a NACK. The wireless device can receive the HARQ feedback indicator from the node for each received PUSCH TTI bundle.

In another configuration, each PUSCH TTI bundle can include 20 contiguous TTIs or 20 interleaved TTIs. Each interleaved TTI can be separated by a TTI not in the PUSCH TTI bundle. A HARQ feedback indicator can be associated with the PUSCH TTI bundle or a plurality of intermediate HARQ feedback indicators can be associated with the PUSCH TTI bundle. Each HARQ feedback indicator can be configured to provide feedback for at least 4 TTIs in the PUSCH TTI bundle.

In another configuration, each PUSCH TTI bundle includes 10 contiguous TTIs with a 20 subframe TTI bundle retransmission delay or a 30 subframe TTI bundle retransmission delay. A HARQ feedback indicator can be associated with each received PUSCH TTI bundle, where the HARQ feedback indicator can include an ACK or a NACK. The wireless device can receive the HARQ feedback indicator from the node for each received PUSCH TTI bundle.

Figure 14:
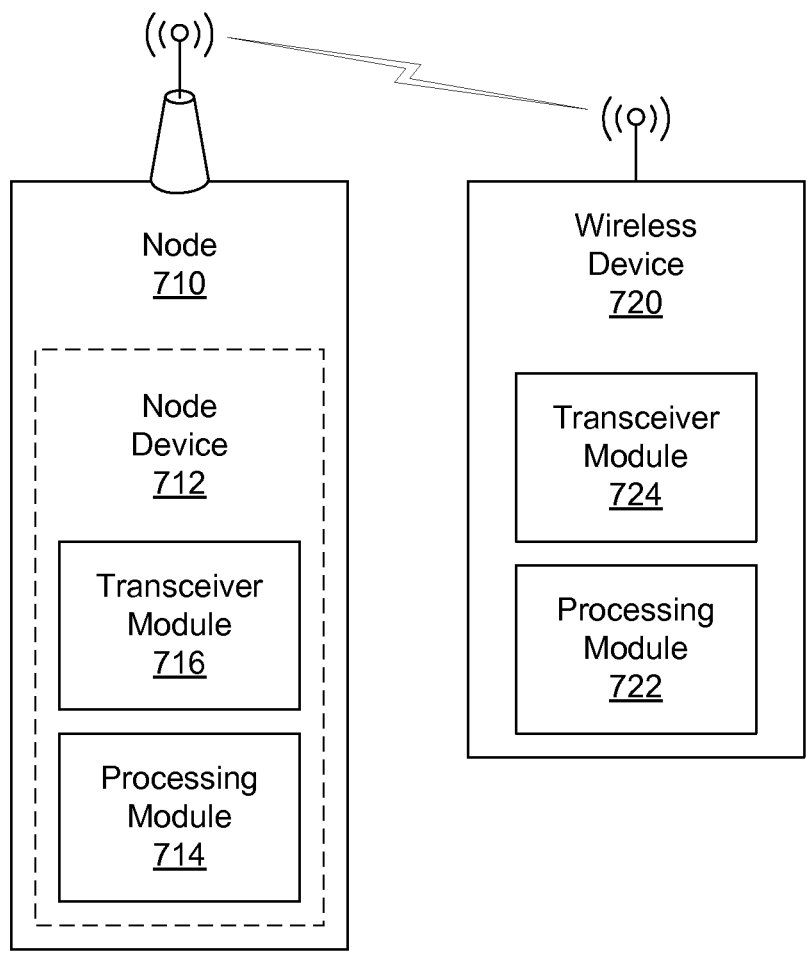
FIG. 14 illustrates a block diagram of a node and a wireless device in accordance with an example.

FIG. 14 illustrates an example node 710 and an example wireless device 720. The node can include a node device 712. The node device or the node can be configured to communicate with the wireless device. The node device can be configured for organizing physical uplink shared channel (PUSCH) transmissions. The node device can include a processing module 714 and a transceiver module 716. The processing module can be configured to generate transmission time interval (TTI) bundling configuration information with instructions to bundle PUSCH transmissions for a hybrid automatic repeat request (HARQ) process in at least 20 TTIs in an approximately 50 subframe time interval in at least one TTI bundle. The transceiver module can be configured to transmit the TTI bundling configuration information to a wireless device to enable the wireless device to transmit a PUSCH signal using the at least one TTI bundle within an approximately 50 subframe time interval.

In a configuration, each TTI bundle can include 4 contiguous TTIs with a 12 subframe TTI bundle retransmission delay and up to 5 HARQ retransmissions for the wireless device. The approximately 50 subframe time interval can be 52 millisecond (ms). In another configuration, each TTI bundle can include 20 contiguous TTIs or 20 interleaved TTIs. Each interleaved TTI can be separated by a TTI not in the TTI bundle. A HARQ feedback indicator can be associated with the TTI bundle or a plurality of intermediate HARQ feedback indicators can be associated with the TTI bundle. Each HARQ feedback indicator can be configured to provide feedback for at least 4 TTIs in the TTI bundle. In another configuration, each TTI bundle can include 10 contiguous TTIs with a 20 subframe TTI bundle retransmission delay or a 30 subframe TTI bundle retransmission delay.

In another example, the transceiver module can be further configured to receive a PUSCH signal transmission including the at least 20 TTIs in at least one TTI bundle within the approximately 50 subframe time interval. The processing module can be further configured to decode data from the received PUSCH signal. The transceiver module can be further configured to transmit at least one hybrid automatic repeat request-acknowledgement (ACK) HARQ-ACK) feedback to the wireless device based on the TTI bundling configuration information and the decoded data.

The node 710 can include a base station (BS), a Node B (NB), an evolved Node B (eNB), a baseband unit (BBU), a remote radio head (RRH), a remote radio equipment (RRE), or a remote radio unit (RRU).

The wireless device 720 can include a transceiver module 724 and a processing module 722. The wireless device can be configured for physical uplink shared channel (PUSCH) transmission time interval (TTI) bundling. The transceiver module can be configured to receive from a node TTI bundling configuration information including instructions to bundle PUSCH transmissions for a hybrid automatic repeat request (HARQ) process in at least 20 TTIs. The processing module can be configured to TTI bundle up to the at least 20 TTIs to form at least one PUSCH TTI bundle. The transceiver module can be further configured to transmit the at least one PUSCH TTI bundle up to the at least 20 TTIs to the node within an approximately 50 subframe time interval.

Each PUSCH TTI bundle can include 4 contiguous TTIs, 20 contiguous TTIs or 20 interleaved TTIs, 10 contiguous TTIs, or 8 contiguous TTIs. The PUSCH TTI bundle including 4 contiguous TTIs can have a 12 subframe TTI bundle retransmission delay with up to 5 HARQ retransmissions. The PUSCH TTI bundle including 20 TTIs can have a HARQ feedback indicator associated with the TTI bundle or a plurality of intermediate HARQ feedback indicators associated with the TTI bundle. Each HARQ feedback indicator can be configured to provide feedback for at least 4 TTIs in the TTI bundle. Each interleaved TTI can be separated by a TTI not in the TTI bundle.

In another example, the transceiver module 724 can be further operable to transmit a PUSCH signal configured for TTI bundling of at least 20 TTIs within the approximately 50 subframe periodic time interval, and retransmit a PUSCH signal based on negative acknowledgement (NACK) hybrid automatic repeat request (HARQ) feedback from the node.

Figure 15:
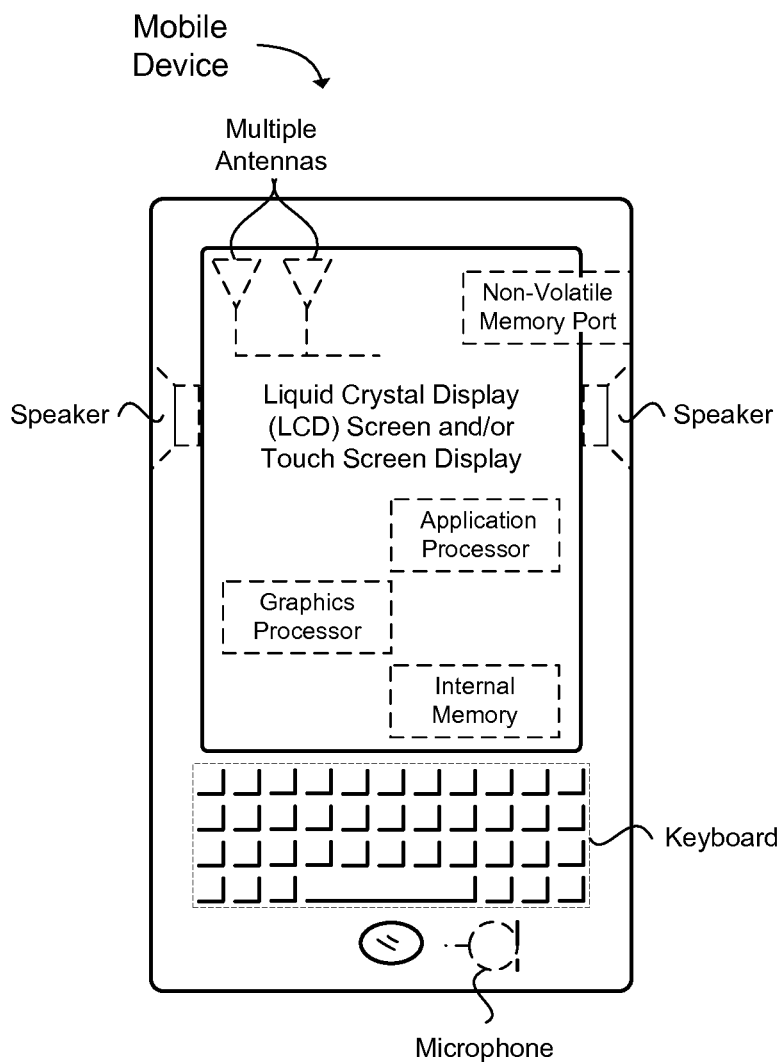
FIG. 15 illustrates a diagram of a wireless device in accordance with an example.

FIG. 15 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 15 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

Accordingly, it is not intended that the invention be limited, except as by the claims set forth below.

What is claimed is:

1. A method for organizing physical uplink shared channel (PUSCH) transmissions, comprising:
generating, at a node, transmission time interval (TTI) bundling configuration information with instructions to bundle PUSCH transmissions for a hybrid automatic repeat request (HARQ) process in at least 20 TTIs in a time interval ranging from 45 to 55 subframes in at least one PUSCH TTI bundle; and
transmitting the TTI bundling configuration information to a wireless device to enable the wireless device to transmit a PUSCH signal using the at least one PUSCH TTI bundle within the time interval ranging from 45 to 55 subframes.

2. The method of claim 1, wherein the time interval ranging from 45 to 55 subframes is a voice over internet protocol (VoIP) air-interface latency constraint for each packet, the at least 20 TTIs is a maximum number of TTIs allocated to each packet, and each packet has a VoIP packet arrival rate of 20 TTIs.

3. The method of claim 1, wherein each TTI is a one millisecond (ms) subframe of a radio frame.

4. The method of claim 1, wherein at least part of the TTI bundling configuration information is transmitted to the wireless device via higher layer radio resource control (RRC) signaling.

5. The method of claim 1, wherein each PUSCH TTI bundle includes 4 contiguous TTIs with a 12 subframe TTI bundle retransmission delay and up to 5 HARQ retransmissions for the wireless device.

6. The method of claim 1, wherein each PUSCH TTI bundle includes 20 contiguous TTIs and a HARQ feedback indicator associated with the PUSCH TTI bundle or a plurality of intermediate HARQ feedback indicators associated with the PUSCH TTI bundle with each HARQ feedback indicator configured to provide feedback for at least 4 TTIs in the PUSCH TTI bundle.

7. The method of claim 1, wherein each PUSCH TTI bundle includes 20 interleaved TTIs, wherein each interleaved TTI is separated by a TTI not in the PUSCH TTI bundle, and a HARQ feedback indicator associated with the PUSCH TTI bundle or a plurality of intermediate HARQ feedback indicators associated with the PUSCH TTI bundle with each HARQ feedback indicator configured to provide feedback for at least 4 TTIs in the PUSCH TTI bundle.

8. The method of claim 1, wherein each PUSCH TTI bundle includes 10 contiguous TTIs with a 20 subframe TTI bundle retransmission delay or a 30 subframe TTI bundle retransmission delay.

9. The method of claim 1 wherein the PUSCH TTI bundle corresponding to an initial HARQ transmission and the PUSCH TTI bundle corresponding to a subsequent HARQ retransmission occupy a different number of TTIs.

10. The method of claim 1, wherein each PUSCH TTI bundle is associated with one instance of an initial PUSCH transmission or a subsequent HARQ retransmission of a PUSCH transmission where the initial and subsequent HARQ retransmissions have different or a same TTI bundle size or configuration.

11. The method of claim 9, wherein the PUSCH TTI bundle corresponding to the initial PUSCH transmission includes 8 contiguous TTIs, and a remaining PUSCH TTI bundles corresponding to HARQ retransmissions includes 4 contiguous TTIs with a 16 subframe TTI bundle retransmission delay.

12. The method of claim 1, wherein a PUSCH TTI bundle carries different redundancy versions to maximize mutual information and extract maximum coding and diversity gain of TTI bundled transmission and retransmissions.

13. The method of claim 1, further comprising:
adaptively configuring a user equipment (UE) specific TTI bundle size based on link adaptation information, wherein each PUSCH TTI bundle can include a TTI bundle size of 4, 8, 10, 12, 16, or 20 subframes, and the TTI bundling configuration information includes the TTI bundle size.

14. The method of claim 1, further comprising:
adaptively combining at least two hybrid automatic repeat request (HARQ) processes, wherein each HARQ process includes the PUSCH TTI bundle, and the TTI bundling configuration information includes redundancy version (RV) information or simple sequence repetition information for each TTI bundle.

15. The method of claim 1, further comprising:
receiving from the wireless device a PUSCH signal transmission including the at least one PUSCH TTI bundle within the time interval ranging from 45 to 55 subframes;
decoding data from the received PUSCH signal; and
transmitting at least one hybrid automatic repeat request-acknowledgement (HARQ-ACK) feedback to the wireless device based on the TTI bundling configuration information and the decoded data.

16. At least one non-transitory machine readable storage medium comprising a plurality of instructions adapted to be executed to implement the method of claim 1.

17. A node device of a node configured for organizing physical uplink shared channel (PUSCH) transmissions, comprising:
a processing module configured to generate transmission time interval (TTI) bundling configuration information with instructions to bundle PUSCH transmissions for a hybrid automatic repeat request (HARQ) process in at least 20 TTIs, in a time interval ranging from 45 to 55 subframes, in at least one TTI bundle; and
a transceiver module configured to transmit the TTI bundling configuration information to a wireless device to enable the wireless device to transmit a PUSCH signal using the at least one TTI bundle within the time interval ranging from 45 to 55 subframes.

18. The node device of claim 17, wherein each TTI bundle includes 4 contiguous TTIs with a 12 subframe TTI bundle retransmission delay and up to 5 HARQ retransmissions for the wireless device, and the time interval is 52 millisecond (ms).

19. The node device of claim 17, wherein each TTI bundle includes 20 contiguous TTIs or 20 interleaved TTIs, wherein each interleaved TTI is separated by a TTI not in the TTI bundle, and a HARQ feedback indicator associated with the TTI bundle or a plurality of intermediate HARQ feedback indicators associated with the TTI bundle with each HARQ feedback indicator configured to provide feedback for at least 4 TTIs in the TTI bundle.

20. The node device of claim 17, wherein each TTI bundle includes 10 contiguous TTIs with a 20 subframe TTI bundle retransmission delay or a 30 subframe TTI bundle retransmission delay.

21. The node device of claim 17, wherein:
the transceiver module is further configured to receive a PUSCH signal transmission including the at least 20 TTIs in at least one TTI bundle within the time interval ranging from 45 to 55 subframes;
the processing module is further configured to decode data from the received PUSCH signal; and
the transceiver module is further configured to transmit at least one hybrid automatic repeat request-acknowledgement (ACK) HARQ-ACK) feedback to the wireless device based on the TTI bundling configuration information and the decoded data.

22. The node device of claim 17, wherein the node is selected from the group consisting of an a base station (BS), a Node B (NB), an evolved Node B (eNB), a baseband unit (BBU), a remote radio head (RRH), a remote radio equipment (RRE), a remote radio unit (RRU), and combinations thereof.

23. At least one non-transitory machine readable storage medium comprising a plurality of instructions adapted to be executed to implement a method for physical uplink shared channel (PUSCH) transmission time interval (TTI) bundling, comprising: receiving, at a wireless device, from a node TTI bundling configuration information including instructions to bundle PUSCH transmissions for a hybrid automatic repeat request (HARQ) process in at least 20 TTIs; bundling up to the at least 20 TTIs to form at least one PUSCH TTI bundle; and transmitting the at least one PUSCH TTI bundle up to the at least 20 TTIs to the node within a time interval ranging from 45 to 55 subframes.

24. The at least one non-transitory machine readable storage medium of claim 23, wherein each PUSCH TTI bundle includes 4 contiguous TTIs with a 12 subframe TTI bundle retransmission delay and up to 5 HARQ retransmissions for the wireless device, and the time interval is 52 millisecond (ms).

25. The at least one non-transitory machine readable storage medium of claim 23, wherein each TTI bundle includes 20 contiguous TTIs or 20 interleaved TTIs, wherein each interleaved TTI is separated by a TTI not in the TTI bundle, and a HARQ feedback indicator associated with the TTI bundle or a plurality of intermediate HARQ feedback indicators associated with the TTI bundle with each HARQ feedback indicator configured to provide feedback for at least 4 TTIs in the TTI bundle.

26. The at least one non-transitory machine readable storage medium of claim 23, wherein each TTI bundle includes 10 contiguous TTIs with a 20 subframe TTI bundle retransmission delay or a 30 subframe TTI bundle retransmission delay.

27. A wireless device configured for physical uplink shared channel (PUSCH) transmission time interval (TTI) bundling, comprising:
a transceiver module configured to receive from a node TTI bundling configuration information including instructions to bundle PUSCH transmissions for a hybrid automatic repeat request (HARQ) process in at least 20 TTIs; and
a processing module configured to TTI bundle up to the at least 20 TTIs to form at least one PUSCH TTI bundle;
wherein the transceiver module is further configured to transmit the at least one PUSCH TTI bundle up to the at least 20 TTIs to the node within a time interval ranging from 45 to 55 subframes.

28. The wireless device of claim 27, wherein each PUSCH TTI bundle includes at least one of:
4 contiguous TTIs with a 12 subframe TTI bundle retransmission delay and up to 5 HARQ retransmissions;
20 contiguous TTIs or 20 interleaved TTIs, wherein each interleaved TTI is separated by a TTI not in the TTI bundle, and a HARQ feedback indicator associated with the TTI bundle or a plurality of intermediate HARQ feedback indicators associated with the TTI bundle with each HARQ feedback indicator configured to provide feedback for at least 4 TTIs in the TTI bundle;
10 contiguous TTIs; and
8 contiguous TTIs.

29. The wireless device of claim 27, wherein the transceiver module is further operable to transmit a PUSCH signal configured for TTI bundling of at least 20 TTIs within the time interval ranging from 45 to 55 subframes, and retransmitting a PUSCH signal based on negative acknowledgement (NACK) hybrid automatic repeat request (HARQ) feedback from the node.

30. The wireless device of claim 27, wherein the wireless device is selected from the group consisting of a user equipment (UE) and a mobile station (MS), and the wireless device includes at least one of an antenna, a touch sensitive display screen, a speaker, a microphone, a graphics processor, an application processor, internal memory, a non-volatile memory port, and combinations thereof.

* * * * *

UNITED STATES PATENT AND TRADEMARK OFFICE
CERTIFICATE OF CORRECTION

PATENT NO. : 8,817,734 B2
APPLICATION NO. : 13/620093
DATED : August 26, 2014
INVENTOR(S) : Alexey Khoryaev et al.

Page 1 of 1

It is certified that error appears in the above-identified patent and that said Letters Patent is hereby corrected as shown below:

On the Title Page

On page 2, Item (56) under "OTHER PUBLICATIONS", in column 2, line 10, Delete "Bratislave," and insert -- Bratislava, --, therefor.

In the Claims

In column 21, line 27, In Claim 21, delete "(ACK) HARQ-ACK)" and insert -- (HARQ-ACK) --, therefor.

In column 21, line 31, In Claim 22, after "of" delete "an".

Signed and Sealed this
Second Day of December, 2014

Michelle K. Lee
*Deputy Director of the United States Patent and Trademark Office*